US00RE51021E

(19) United States
(12) Reissued Patent
Ichimura

(10) Patent Number: US RE51,021 E
(45) Date of Reissued Patent: Sep. 1, 2026

(54) REAR ATTACHMENT LENS AND IMAGE PICKUP OPTICAL SYSTEM USING THE SAME

(71) Applicant: CANON KABUSHIKI KAISHA, Tokyo (JP)

(72) Inventor: Junya Ichimura, Utsunomiya (JP)

(73) Assignee: Canon Kabushiki Kaisha, Tokyo (JP)

(21) Appl. No.: 18/387,791

(22) Filed: Nov. 7, 2023

Related U.S. Patent Documents

Reissue of:
(64) Patent No.: 11,169,365
Issued: Nov. 9, 2021
Appl. No.: 16/839,500
Filed: Apr. 3, 2020

(30) Foreign Application Priority Data

Apr. 8, 2019 (JP) ..... 2019-073253

(51) Int. Cl.

| | |
|---|---|
| ***G02B 15/10*** | (2006.01) |
| ***G02B 9/02*** | (2006.01) |
| ***G02B 15/08*** | (2006.01) |
| ***G02B 15/177*** | (2006.01) |
| ***G02B 15/20*** | (2006.01) |
| ***H04N 23/55*** | (2023.01) |

(52) U.S. Cl.
CPC ..... *G02B 15/10* (2013.01); *G02B 9/02* (2013.01); *G02B 15/08* (2013.01); *G02B 15/177* (2013.01); *G02B 15/20* (2013.01); *H04N 23/55* (2023.01)

(58) Field of Classification Search
CPC ..... G02B 15/10; G02B 9/02; G02B 15/08; G02B 15/177; G02B 15/20; G02B 15/145113; G02B 13/0015; H04N 23/55; G03B 17/14
USPC ..... 359/675
See application file for complete search history.

(56) References Cited

U.S. PATENT DOCUMENTS 4,770,508 A * 9/1988 Yamada ..... G02B 15/08 359/675
4,830,474 A * 5/1989 Nakayama ..... G02B 15/10 359/675
5,032,012 A * 7/1991 Aoki ..... G02B 3/0087 359/652
5,082,360 A * 1/1992 Sato ..... G02B 15/1421 359/675

(Continued)

FOREIGN PATENT DOCUMENTS

CN 101546029 A 9/2009
CN 102096177 A 6/2011

(Continued)

*Primary Examiner* — Kenneth Whittington
(74) *Attorney, Agent, or Firm* — Canon U.S.A., Inc., IP Division

(57) ABSTRACT

A rear attachment lens according to the aspect of the embodiments is configured to vary a focal length of a system by being attached to an image side of a master lens. The rear attachment lens includes a positive lens arranged closest to the image side in which a lens surface on the image side of the positive lens has a shape convex toward the image side. A focal length of the rear attachment lens, a magnification of the rear attachment lens when attached to the master lens, and a distance from the lens surface on the image side of the positive lens to a rear principal point position of the rear attachment lens when attached to the master lens are appropriately set.

18 Claims, 22 Drawing Sheets

(56) References Cited

U.S. PATENT DOCUMENTS

| | | | | |
|---|---|---|---|---|
| 2002/0191303 | A1 | 12/2002 | Yamakawa | |
| 2011/0080647 | A1* | 4/2011 | Sugita | G02B 27/0062 359/675 |
| 2015/0226943 | A1* | 8/2015 | Ogata | G02B 15/12 348/374 |
| 2015/0346465 | A1* | 12/2015 | Yonezawa | G02B 15/12 359/675 |
| 2018/0348477 | A1 | 12/2018 | Inukai | |

FOREIGN PATENT DOCUMENTS

| | | | |
|---|---|---|---|
| CN | 108983405 | A | 12/2018 |
| CN | 109073868 | A | 12/2018 |
| JP | S63-106715 | A | 5/1988 |
| JP | 2011017849 | A | 1/2011 |
| JP | 2011-123336 | A | 6/2011 |
| JP | 2014-115410 | A | 6/2014 |
| NO | 2016-035119 | A1 | 3/2016 |
| WO | 2017/134928 | A1 | 8/2017 |

* cited by examiner

REAR ATTACHMENT LENS AND IMAGE PICKUP OPTICAL SYSTEM USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Field of the Invention

The aspect of the embodiments relates to a rear attachment lens detachably attached between a master lens for image pickup and an image pickup element and configured to make a focal length of the entire system longer than the original focal length of the master lens.

Description of the Related Art

There has been known a rear attachment lens attached between a master lens for image pickup and an image pickup element and configured to make a focal length of the entire system longer than the focal length of the master lens alone (Japanese Patent Application Laid-Open Nos. S63-106715 and 2011-123336, and International Publication No. WO2017/134928).

The rear attachment lens making the focal length of the entire system longer than the focal length of the master lens alone generally has a negative refractive power. Having this refractive power, the rear attachment lens enlarges an image to be formed, and makes the focal length of the entire system longer than the focal length of the master lens alone according to the magnification. In this operation, there is such a feature that the F-value (F-number) becomes dark according to the magnification.

Since aberrations of the master lens are corrected by itself, aberrations of the rear attachment lens to be attached on the image side of the master lens also need to be corrected well by itself. Specifically, among the aberrations, a field curvature and a lateral chromatic aberration need to be corrected sufficiently for the rear attachment lens. Japanese Patent Application Laid-Open No. S63-106715 discloses conditions for obtaining favorable image plane characteristics, while Japanese Patent Application Laid-Open No. 2011-123336 discloses a method of correcting the lateral chromatic aberration well.

Since Japanese Patent Application Laid-Open Nos. S63-106715 and 2011-123336 disclose primarily a single reflex system (image pickup apparatus), a considerably long back focus of the master lens is secured, so that the rear attachment lens may be configured to have a relatively weak refractive power. Thus, the rear attachment lens is characterized by obtaining favorable aberrations easily. Besides, when a quick return mirror is arranged on the image side of the rear attachment lens, the master lens needs to have a long back focus.

On the other hand, in a mirrorless camera which does not employ the quick return mirror, the master lens may have a short back focus. For this reason, the mirrorless cameras have a need for a rear attachment lens that can obtain favorable aberrations even with a short back focus.

International Publication No. WO2017/134928 discloses a rear attachment lens for a mirrorless camera, which is adapted for the master lens having a short back focus.

In general, when the back focus of the master lens to which the rear attachment lens is to be attached is short, the focal length of the rear attachment lens is accordingly short to obtain the same magnification because the rear attachment lens having a negative refractive power needs to be arranged on the image side. In general, when the negative refractive power of the rear attachment lens is increased, the Petzval sum is increased in a negative direction, and the image plane characteristics are decreased. Thus, the image plane characteristics need to be corrected well.

Additionally, when the back focus of the master lens is short, a length from the image plane to the exit pupil is short. For this reason, in the master lens having a short length between the image plane and the exit pupil, it is easy to increase the magnification of the rear attachment lens. However, in a telephoto lens for which it is effective to use the rear attachment lens, a long length from the image plane to the exit pupil is more beneficial from the viewpoint of obtaining high optical performance.

SUMMARY OF THE INVENTION

A rear attachment lens according to the aspect of the embodiments is configured to vary a focal length of an entire system by being attached to an image side of a master lens. The rear attachment lens includes a positive lens arranged closest to the image side in which a lens surface on the image side of the positive lens has a shape convex toward the image side. The rear attachment lens satisfies the following conditional expression:

$$|fe|/(fe\times(1-\beta e)+np2)>9,$$

where fe represents a focal length of the rear attachment lens, βe represents a magnification of the rear attachment lens when attached to the master lens, and np2 represents a distance from the lens surface on the image side of the positive lens to a rear principal point position of the rear attachment lens when attached to the master lens.

Further features of the disclosure will become apparent from the following description of exemplary embodiments with reference to the attached drawings.

DESCRIPTION OF THE EMBODIMENTS

Hereinafter, favorable embodiments of the disclosure are described with reference to the accompanying drawings.

A rear attachment lens of the aspect of the embodiments is detachably attached on the image side of a master lens (primary lens system). A focal length of the entire system obtained when the rear attachment lens is attached on the image side of the master lens is made longer than the focal length of the master lens.

FIGS. 1, 3, 5, 7, 9, 11, 13, and 15 are cross-sectional views of rear attachment lenses of Examples 1 to 8, respectively. FIGS. 2, 4, 6, 8, 10, 12, 14, and 16 are aberration diagrams of cases where the rear attachment lenses of Examples 1 to 8 are each attached to a master lens. The magnification of a focal length of the entire system obtained when the rear attachment lens is attached to the master lens with respect to the focal length of the master lens (magnification of the rear attachment lens) is 1.4 times in Examples 1, 2, and 7 and is 2.0 times in Examples 3 to 6 and 8.

In each of the cross-sectional views, ML represents the master lens, and EL represents the rear attachment lens. In the master lens ML, Bi represents an i-th lens unit. An arrow indicates a moving direction of the lens unit during focusing from infinity to a close distance. img represents an image plane. STO represents an aperture stop. Lr represents a positive lens that is closest to the image side of the rear attachment lens EL, and L1 represents a positive lens that is closest to the object side of the rear attachment lens.

The aberration diagram of the master lens ML and the aberration diagrams of cases where the rear attachment lens EL is attached to the master lens ML each illustrate a spherical aberration, astigmatism, a distortion, and a lateral chromatic aberration from the left side of the paper surface.

In the spherical aberration diagram, d of a solid line represents an aberration of d-line (wavelength of 587.56 nm), f of a broken line represents an aberration of f-line (wavelength of 486.13 nm), C of a dashed-dotted line represents an aberration of C-line (wavelength of 656.27 nm), and g of a dashed double-dotted line represents an aberration of g-line (wavelength of 435.83 nm). The scale of the horizontal axis is an amount of defocus, which is −0.4 to +0.4 [mm].

In the astigmatism diagram, S of a solid line represents a field curvature of a sagittal image plane, and M of a dotted line represents a field curvature of a meridional image plane. The horizontal axis is similar to that of the spherical aberration diagram.

In the distortion diagram, the scale of the horizontal axis is indicated by −5 to +5 [%]. The lateral chromatic aberration diagram indicates displacement from the d-line, and the scale of the horizontal axis is −0.03 to +0.03 [mm].

Figure 1:
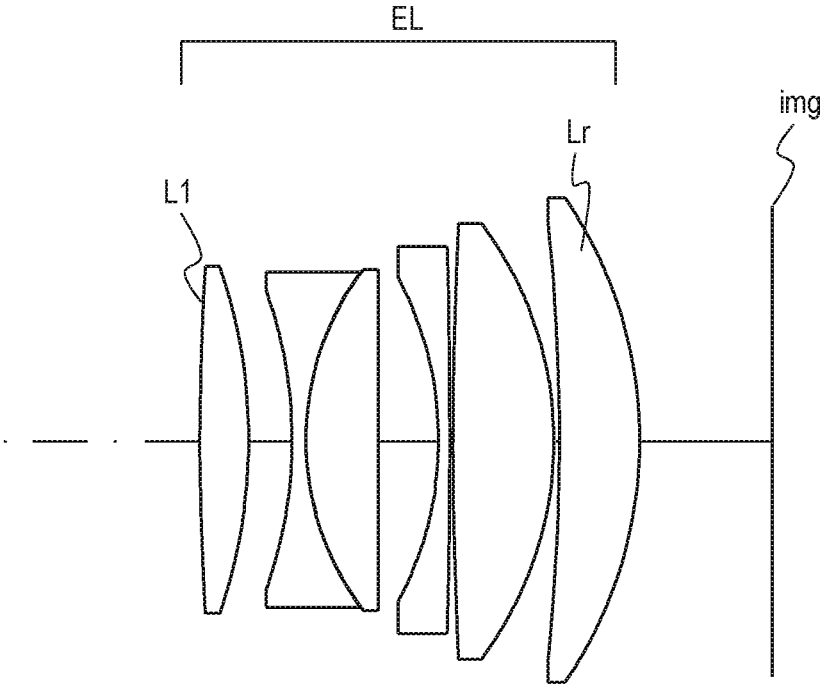
FIG. 1 is a cross-sectional view of a rear attachment lens of Example 1.
Figure 2:
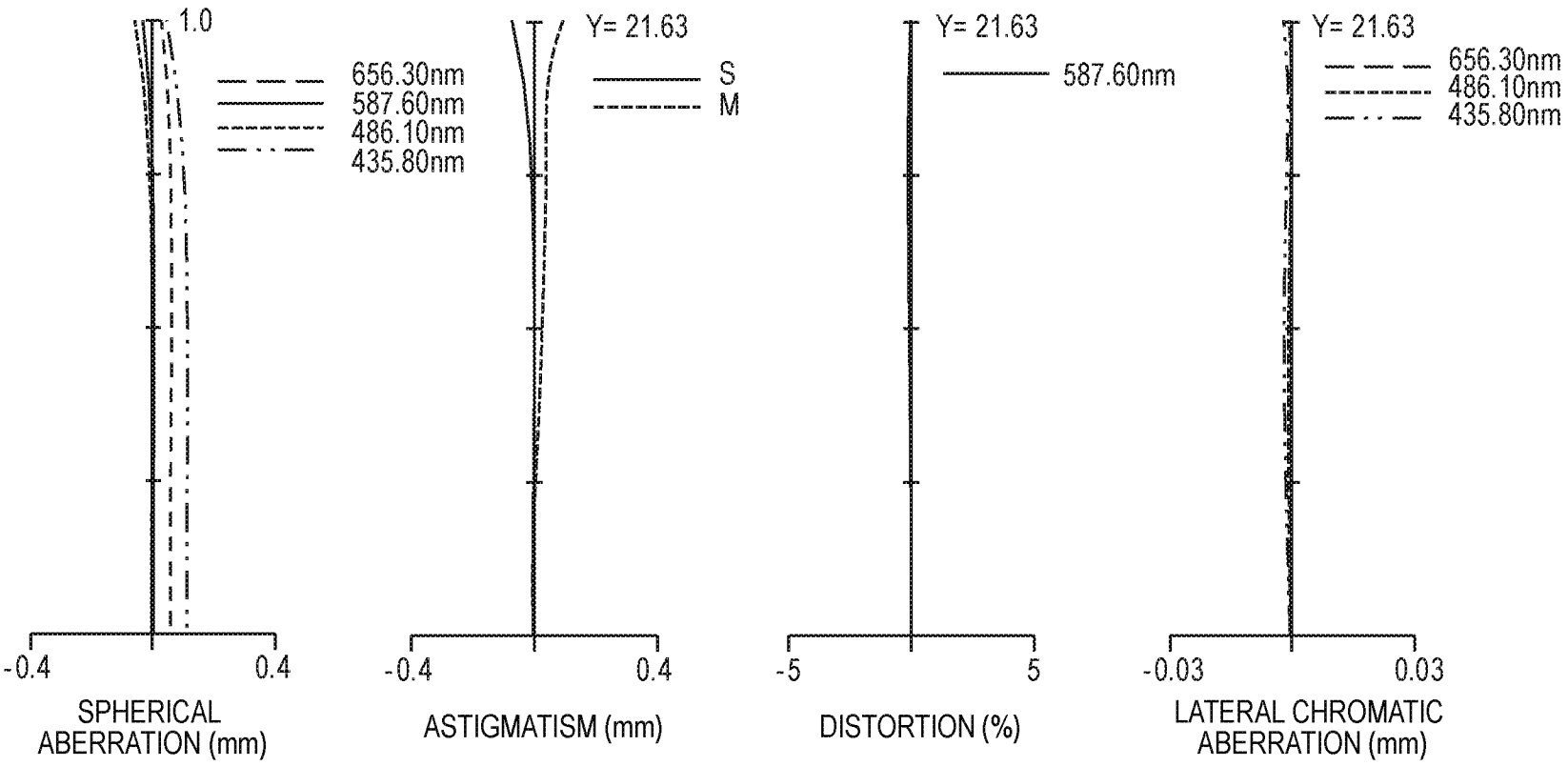
FIG. 2 is an aberration diagram of a case where the rear attachment lens of Example 1 is attached to a master lens.
Figure 3:
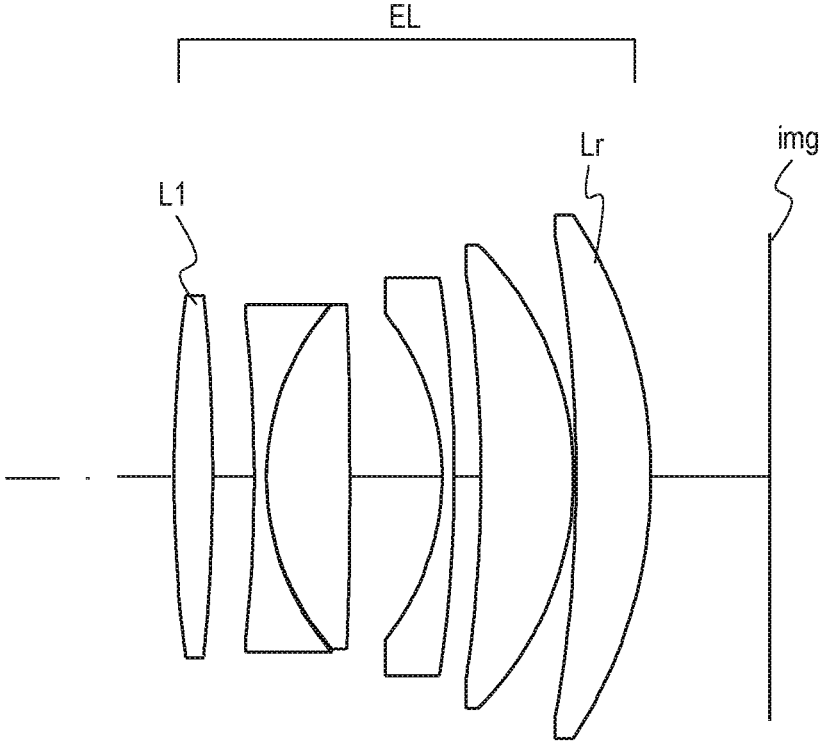
FIG. 3 is a cross-sectional view of a rear attachment lens of Example 2.
Figure 4:
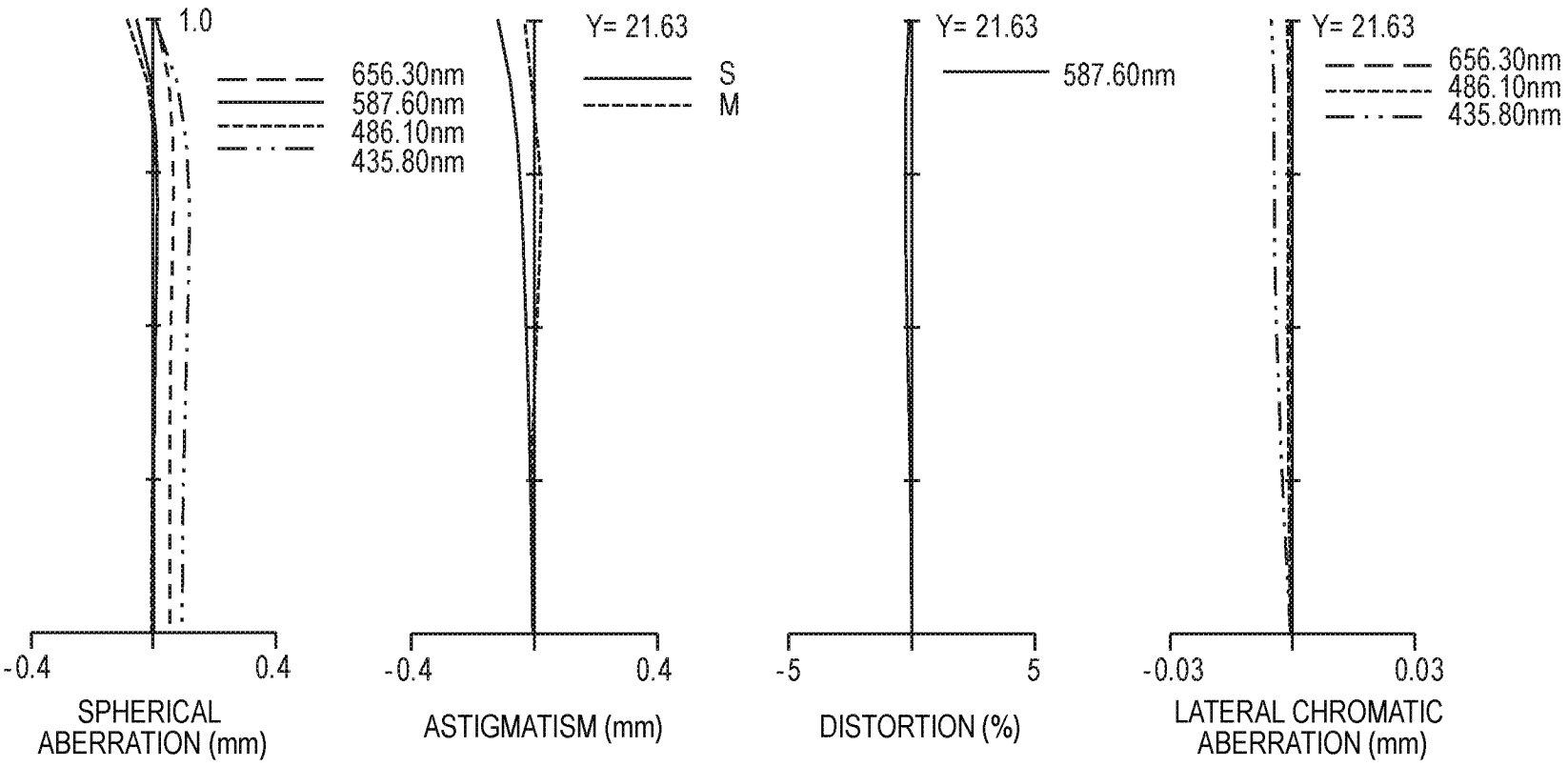
FIG. 4 is an aberration diagram of a case where the rear attachment lens of Example 2 is attached to the master lens.
Figure 5:
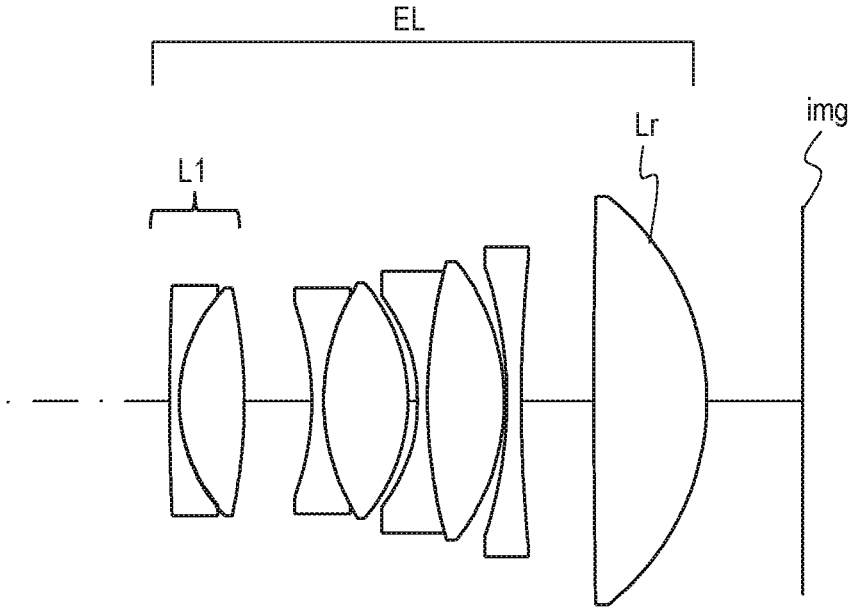
FIG. 5 is a cross-sectional view of a rear attachment lens of Example 3.
Figure 6:
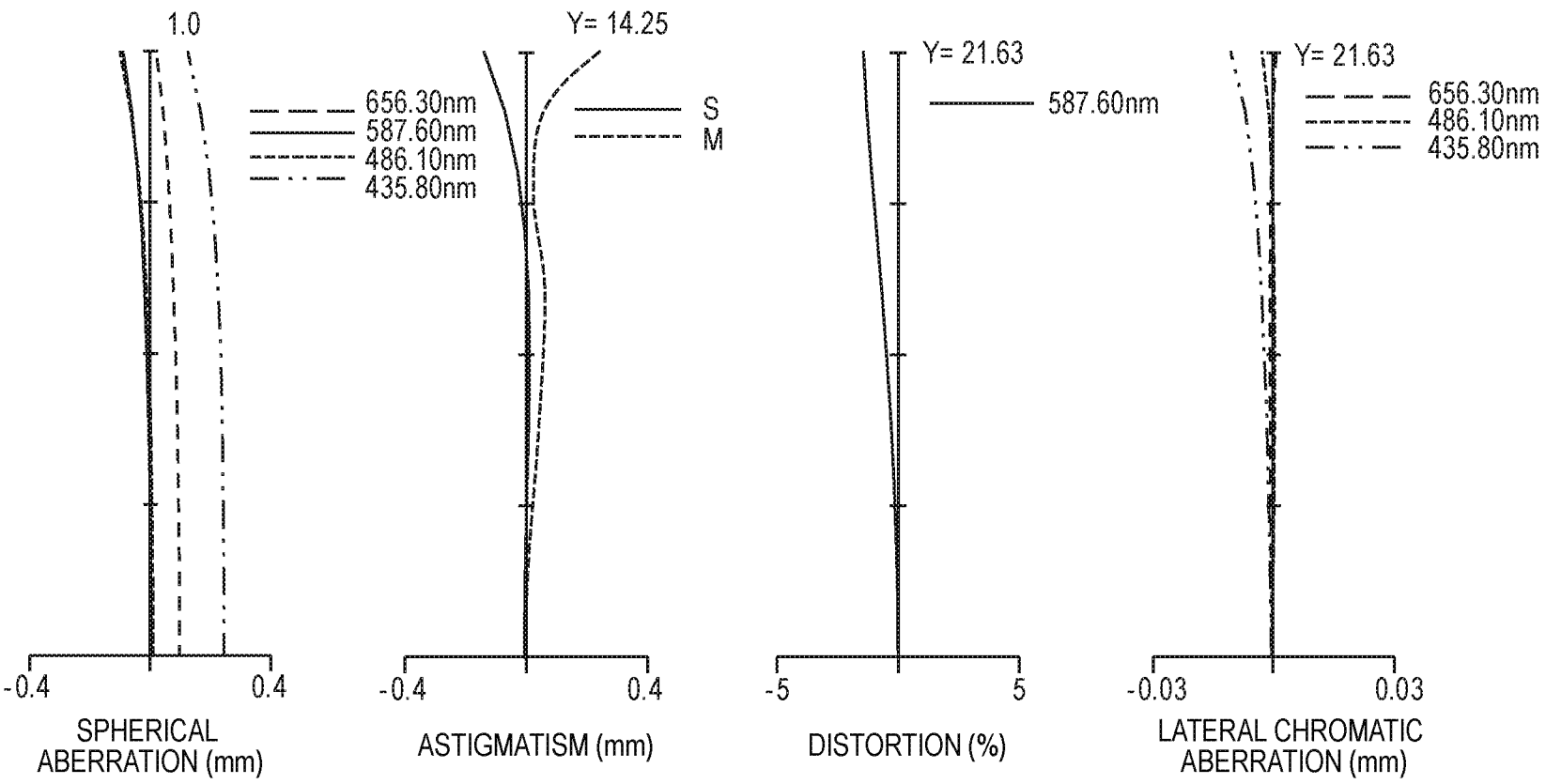
FIG. 6 is an aberration diagram of a case where the rear attachment lens of Example 3 is attached to the master lens.
Figure 7:
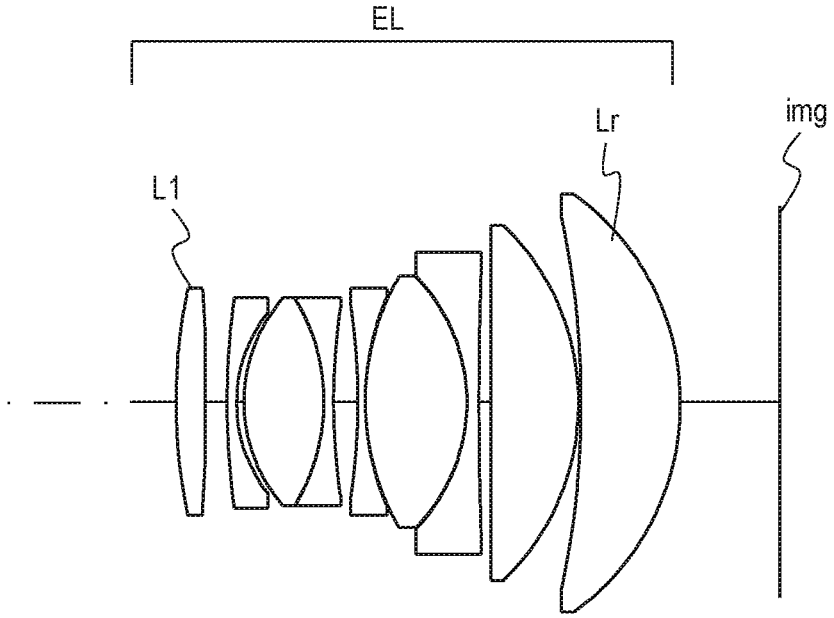
FIG. 7 is a cross-sectional view of a rear attachment lens of Example 4.
Figure 8:
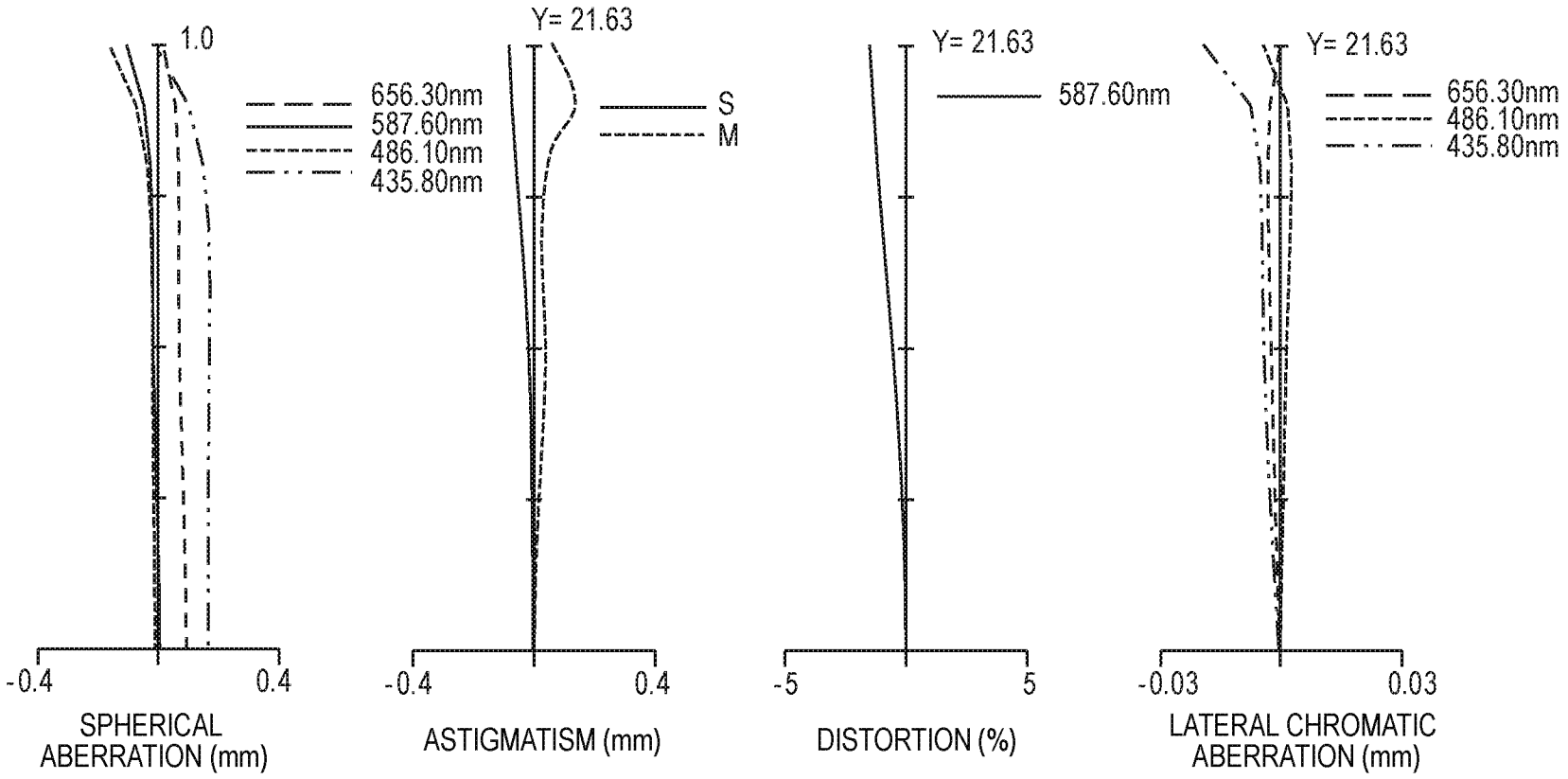
FIG. 8 is an aberration diagram of a case where the rear attachment lens of Example 4 is attached to the master lens.
Figure 9:
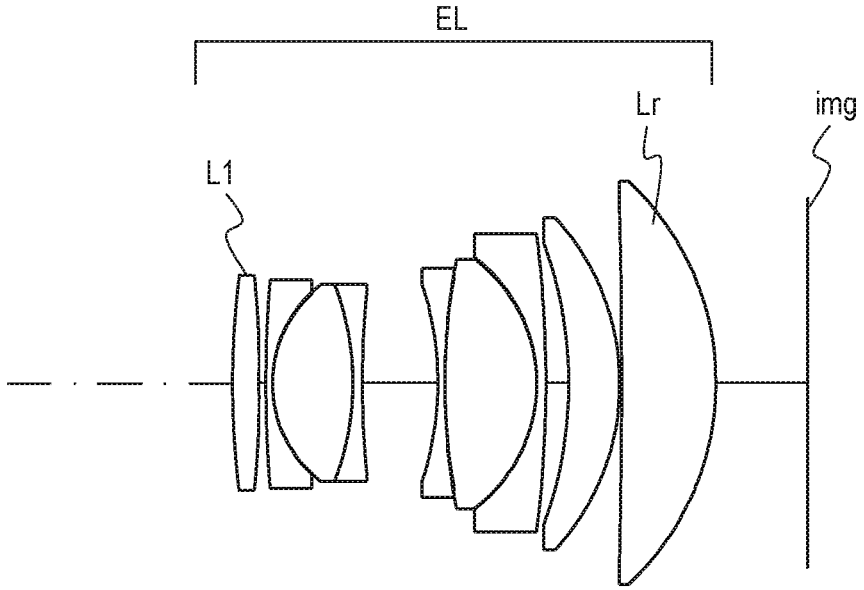
FIG. 9 is a cross-sectional view of a rear attachment lens of Example 5.
Figure 10:
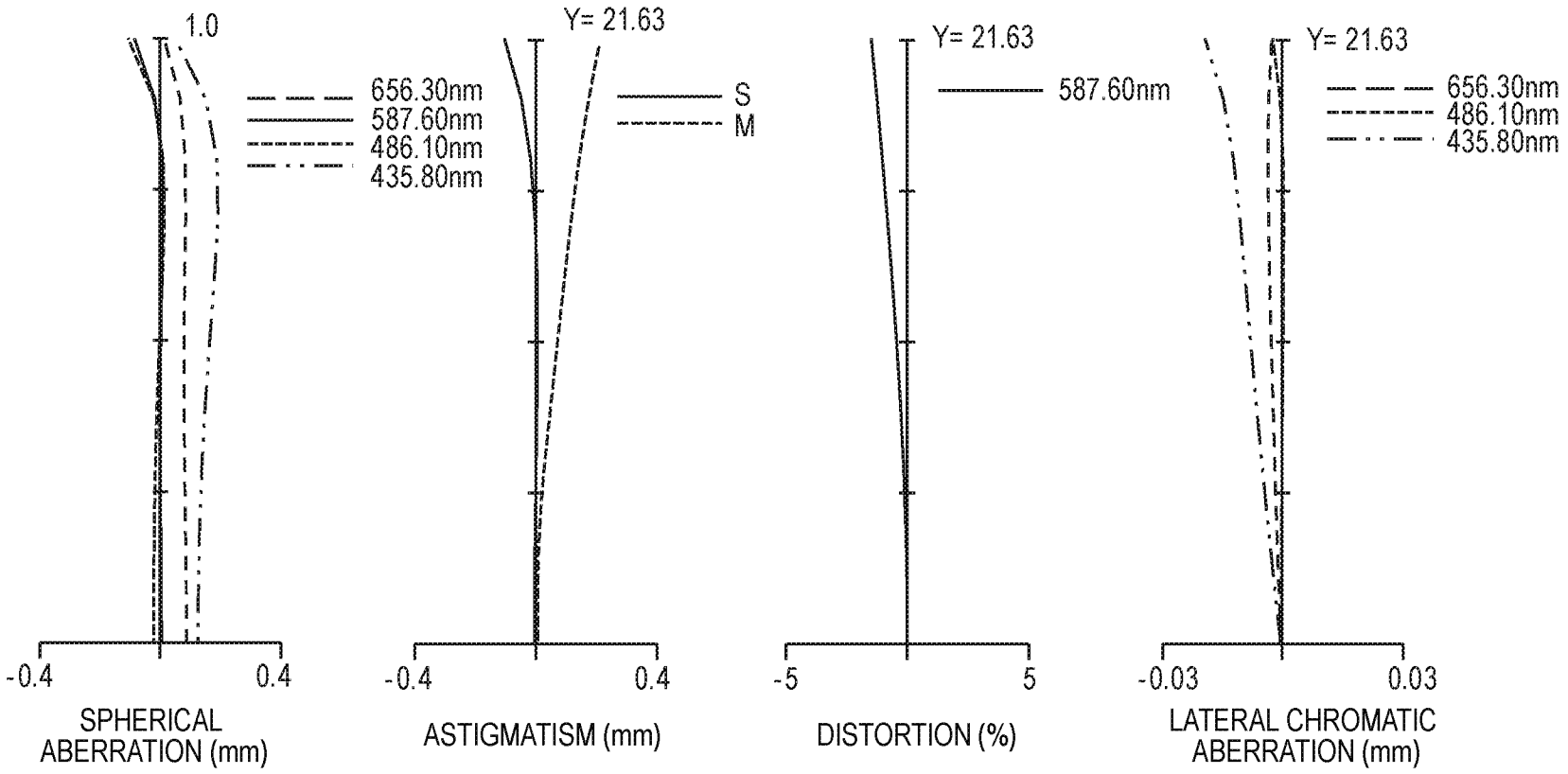
FIG. 10 is an aberration diagram of a case where the rear attachment lens of Example 5 is attached to the master lens.
Figure 11:
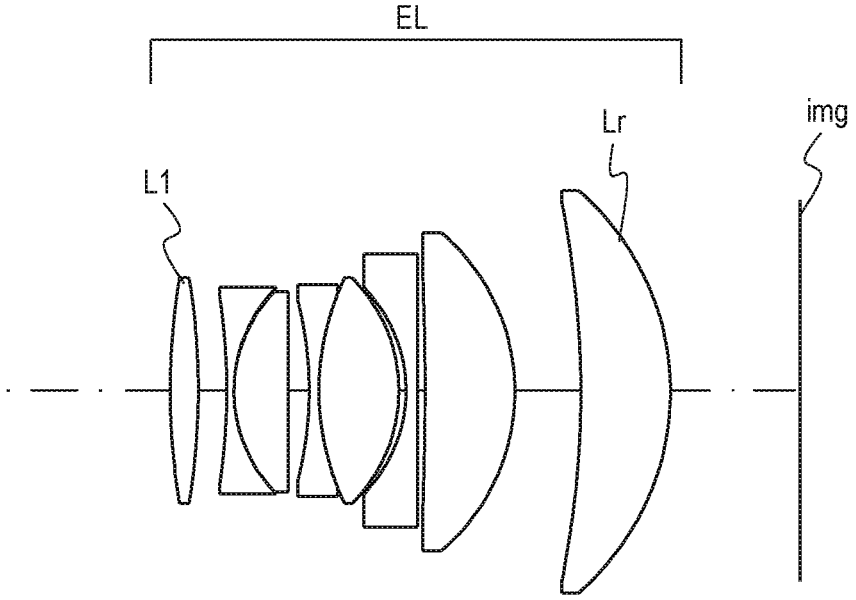
FIG. 11 is a cross-sectional view of a rear attachment lens of Example 6.
Figure 12:
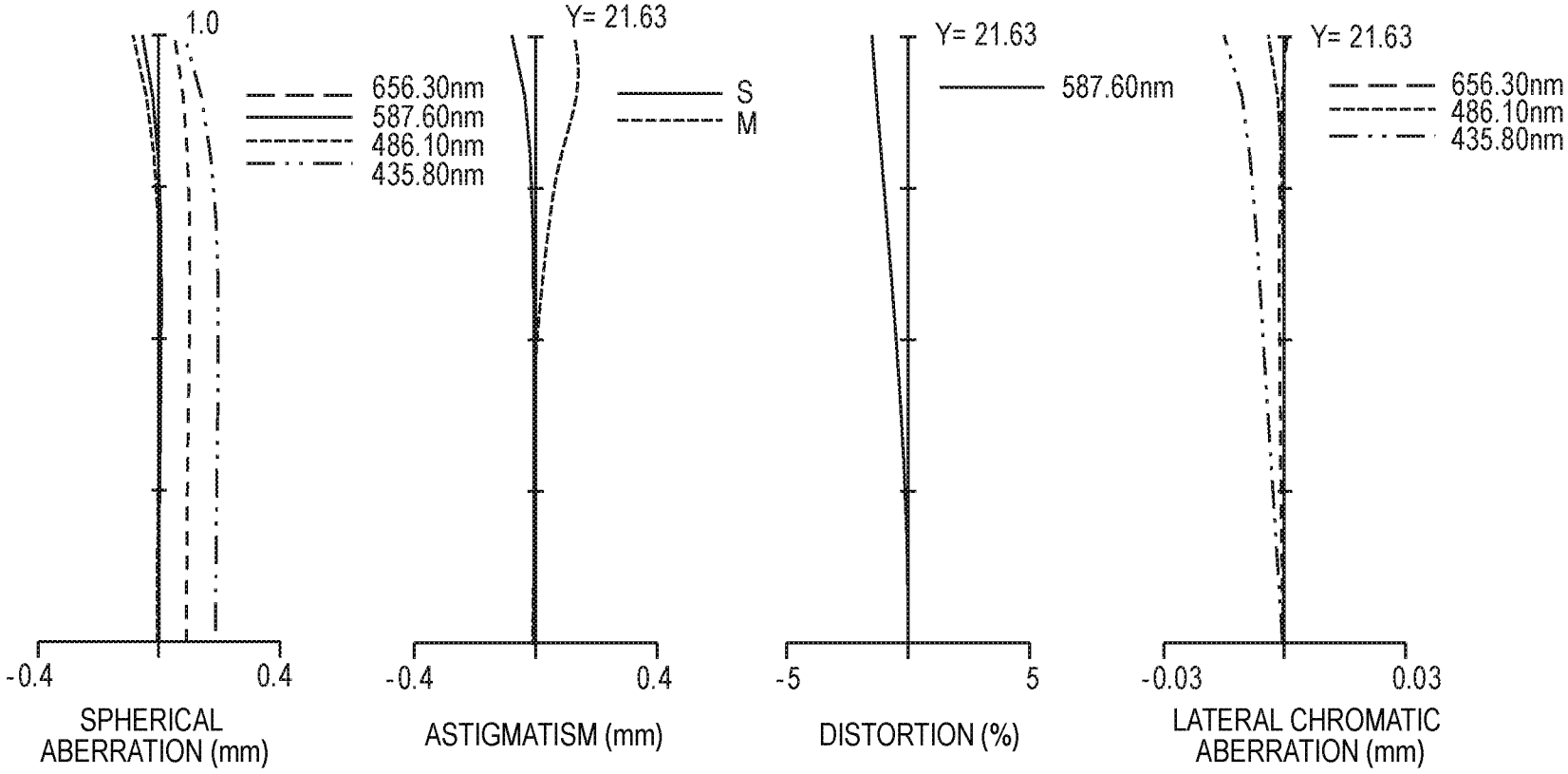
FIG. 12 is an aberration diagram of a case where the rear attachment lens of Example 6 is attached to the master lens.
Figure 13:
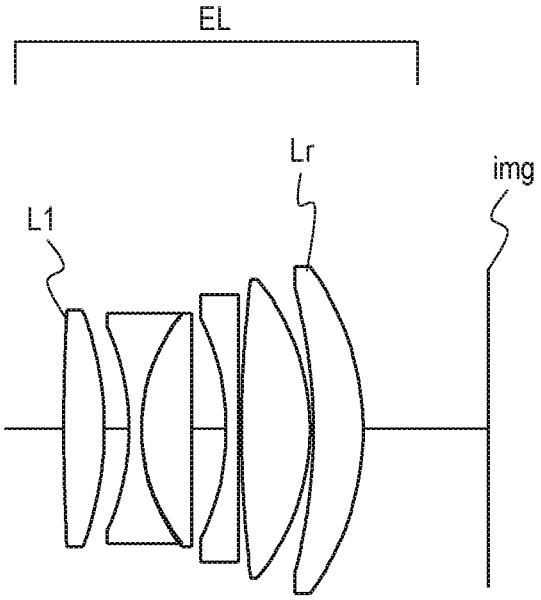
FIG. 13 is a cross-sectional view of a rear attachment lens of Example 7.
Figure 14:
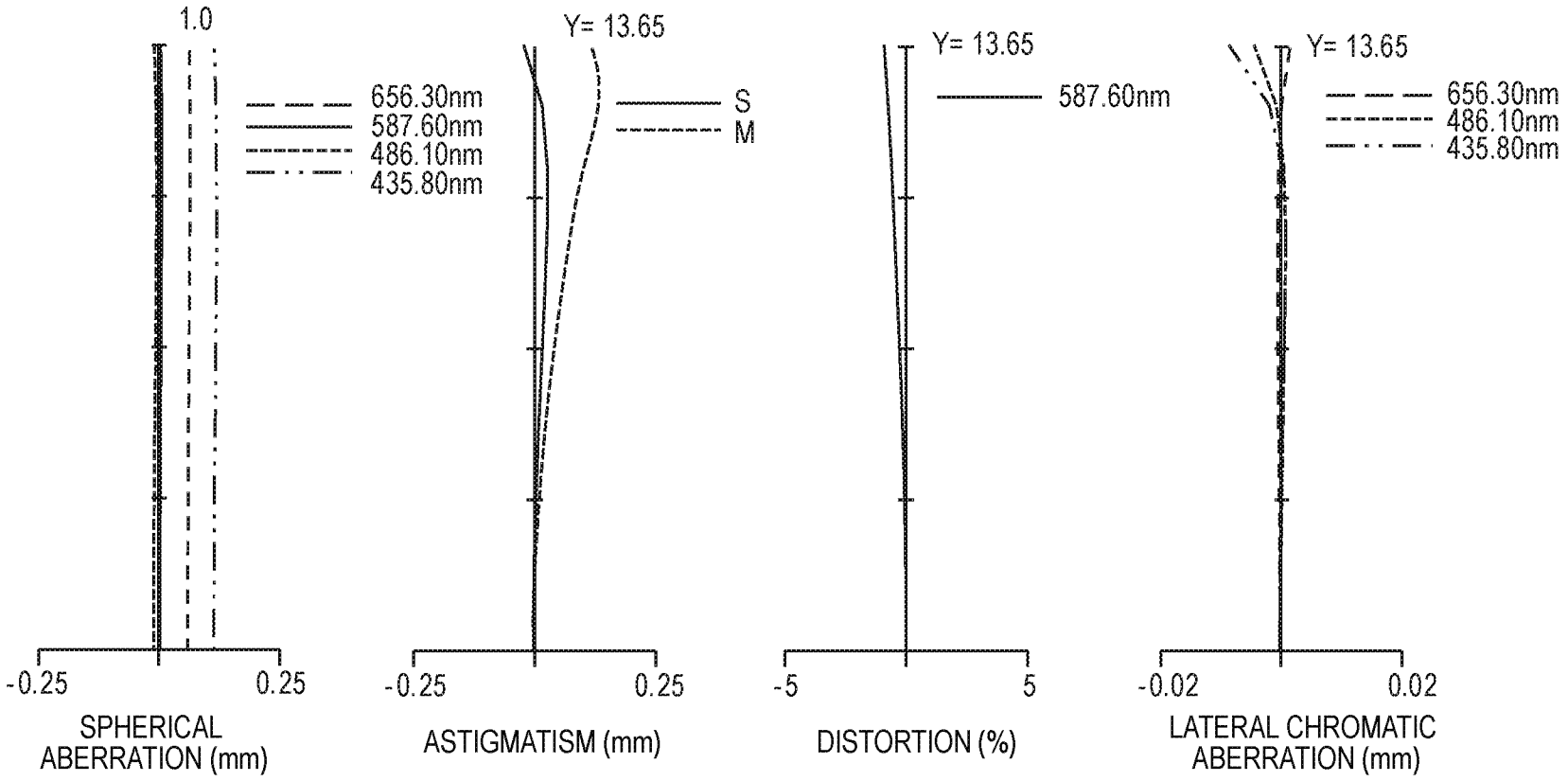
FIG. 14 is an aberration diagram of a case where the rear attachment lens of Example 7 is attached to the master lens.
Figure 15:
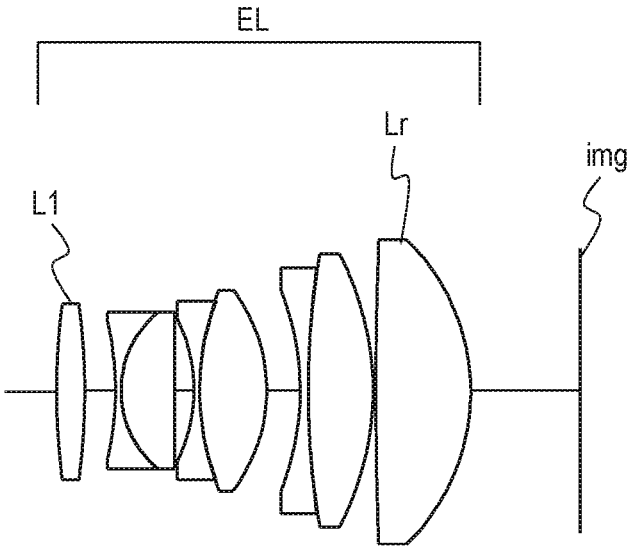
FIG. 15 is a cross-sectional view of a rear attachment lens of Example 8.
Figure 16:
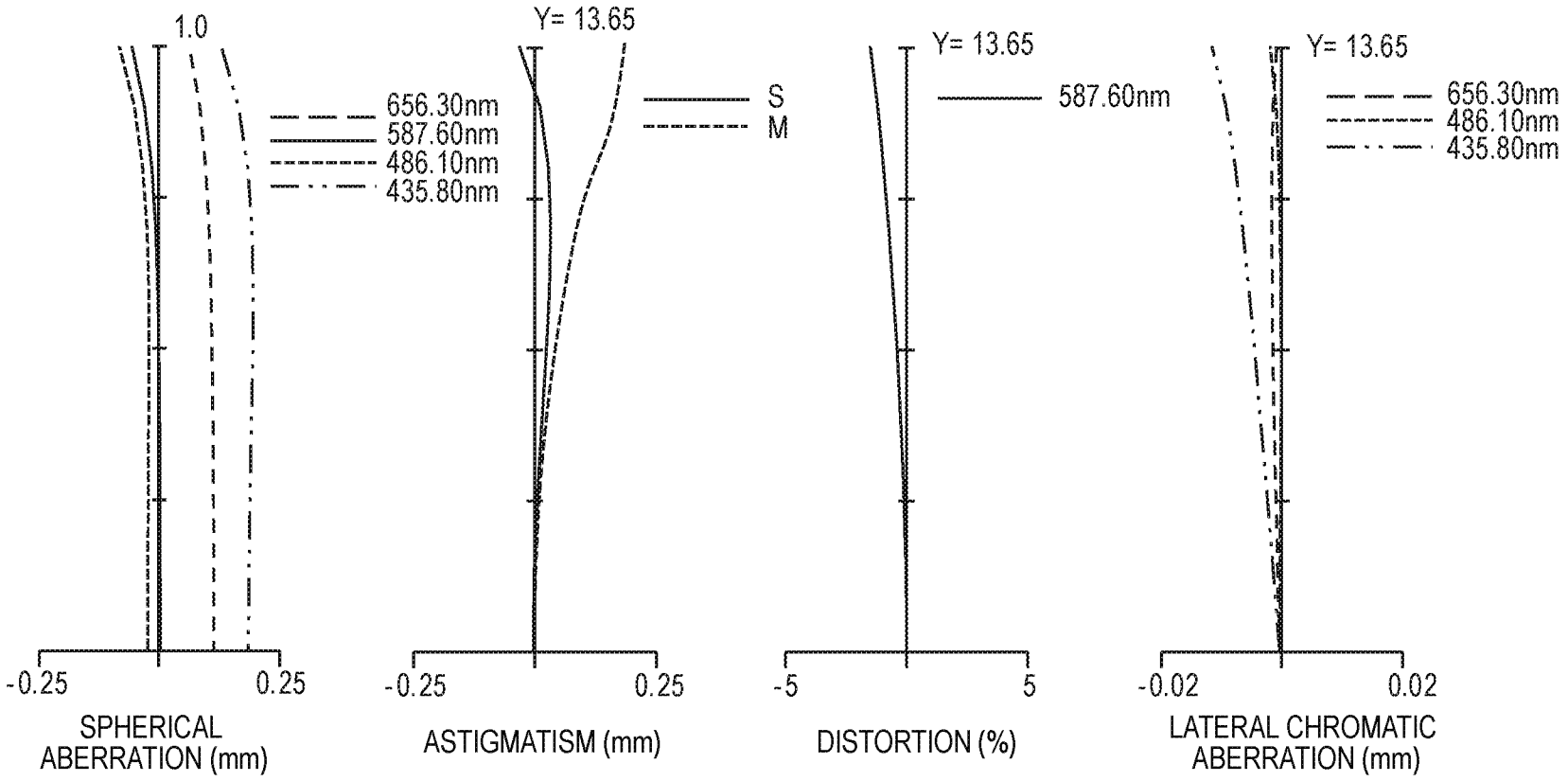
FIG. 16 is an aberration diagram of a case where the rear attachment lens of Example 8 is attached to the master lens.
Figure 17:
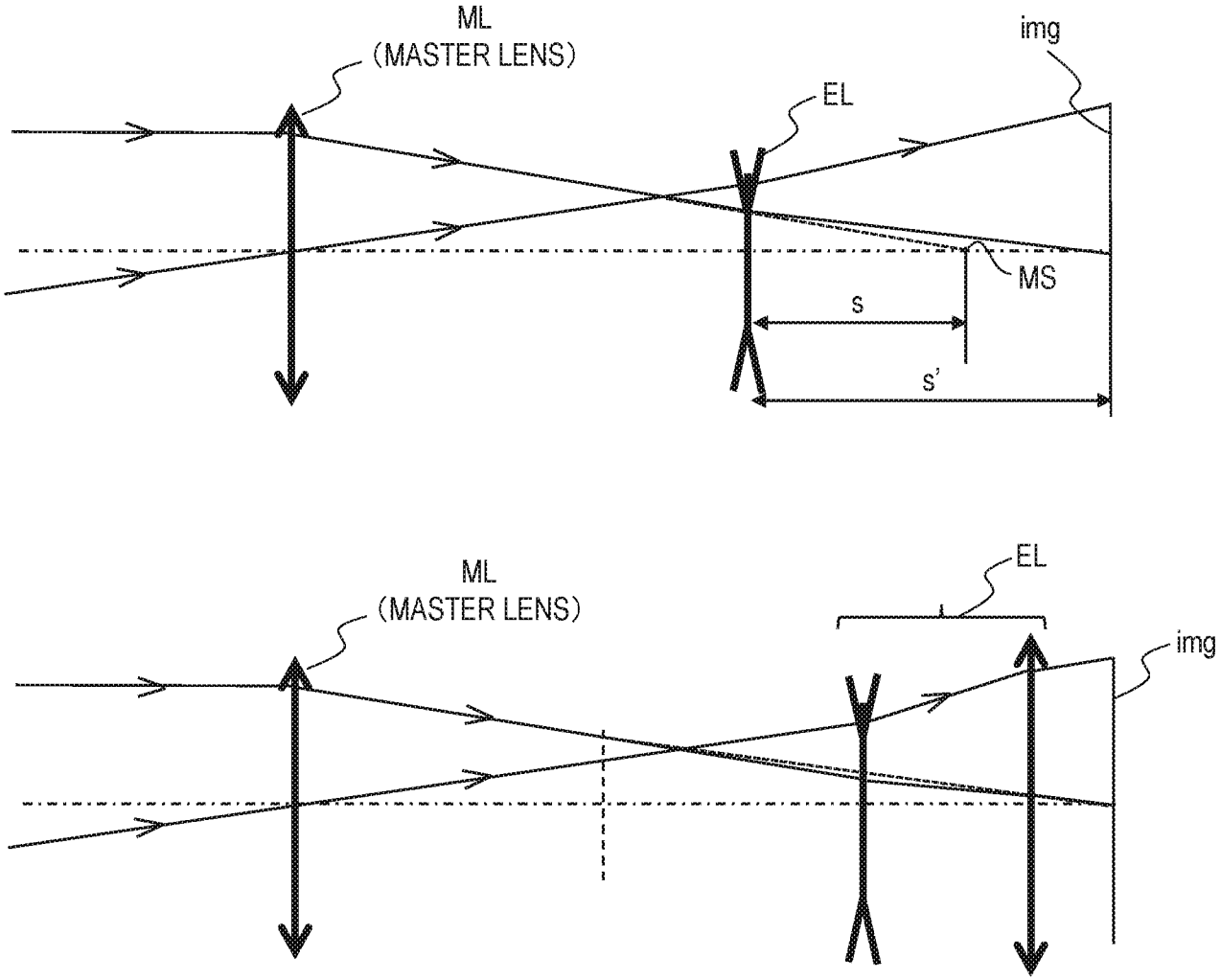
FIG. 17 is an explanatory diagram of a paraxial refractive power arrangement of a case where the rear attachment lens is attached to the master lens.
Figure 18:
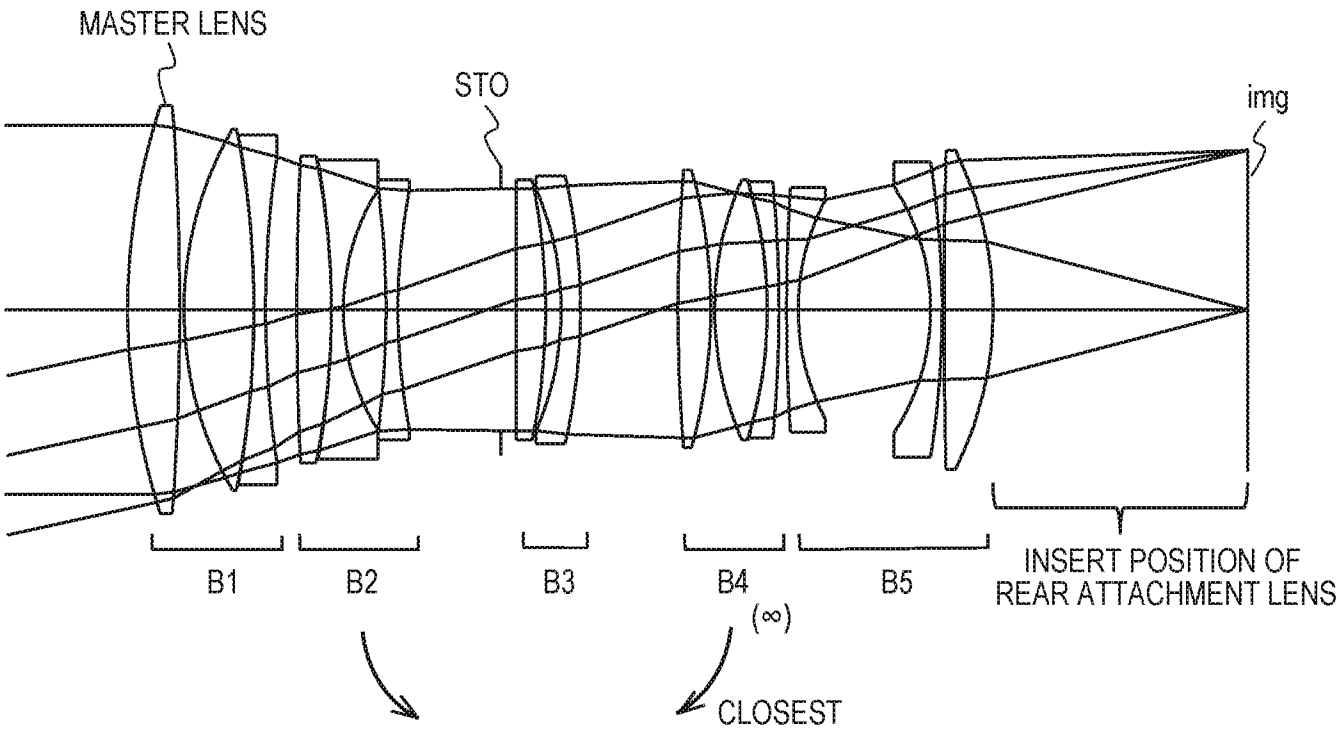
FIG. 18 is a cross-sectional view of the master lens.
Figure 19:
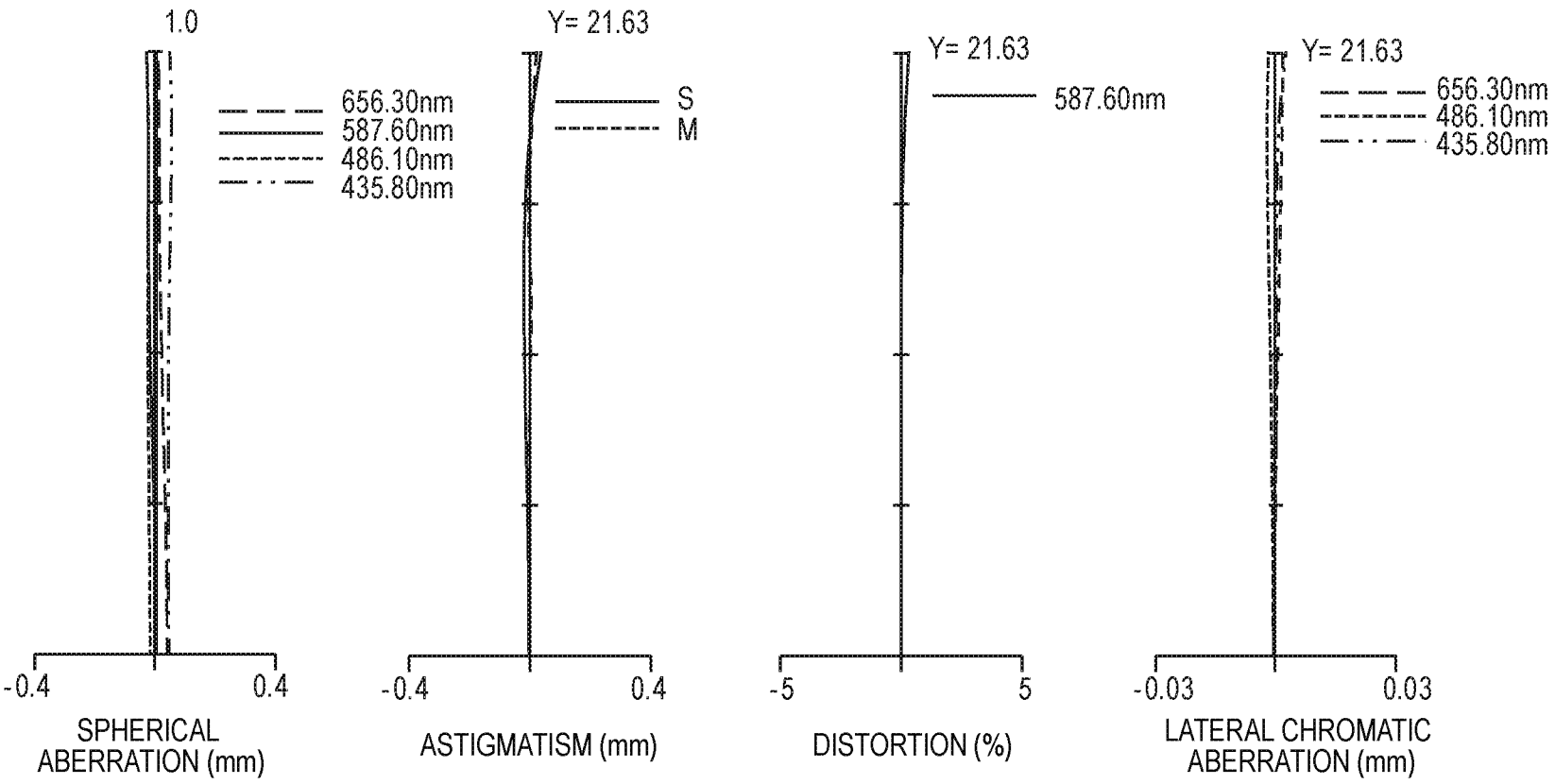
FIG. 19 is an aberration diagram of the master lens.
Figure 20:
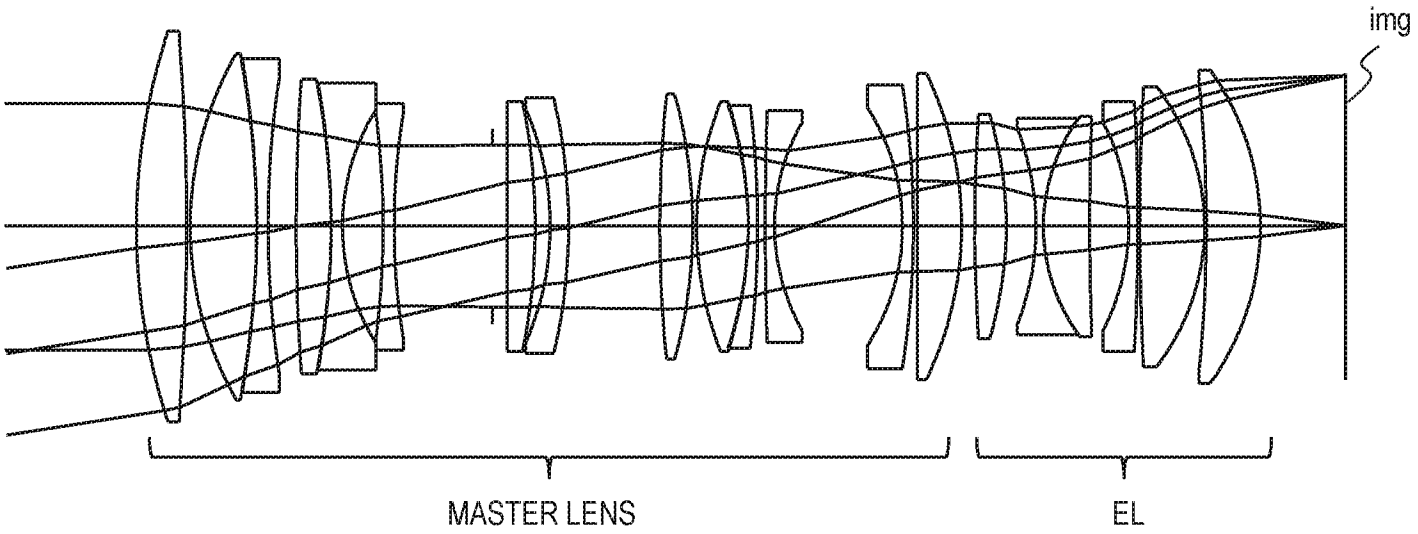
FIG. 20 is a cross-sectional view of a case where the rear attachment lens of Example 1 is attached to the master lens.

A top diagram in FIG. 17 illustrates a schematic diagram of the rear attachment lens EL with the master lens (primary lens system) ML having a sufficiently long back focus, and an outward arrow represents a lens of a positive refractive power, and an inward arrow represents a lens of a negative refractive power.

When the back focus of the master lens ML is sufficiently long, a distance s from an imaging point MS of the master lens ML to the rear attachment lens EL can be made sufficiently long. Thus, a focal length of the rear attachment lens EL that is required to obtain a magnification $\beta$ of the same rear attachment lens EL can be made long (this is because $\beta=1/(1+s/fe)$). If refractive power can be weakened, it is possible to facilitate correction of the Petzval sum, and thus a favorable field curvature can be obtained.

On the other hand, when the back focus of the master lens ML is short, and the distance s from the imaging point of the master lens ML to the rear attachment lens EL is short like the case illustrated in a bottom diagram in FIG. 17, the refractive power of the rear attachment lens EL is increased in a negative direction, as the opposite of the former case. This makes the Petzval sum remain on the negative side greatly, and it is difficult to obtain a favorable field curvature.

Since the Petzval sum can be expressed simply by $\Sigma(\varphi k/Nk)$ using a refractive power $\varphi k$ of each lens and a refractive index Nk of material, the Petzval sum is generally improved by using material of a high refractive index for a negative lens and using material of a low refractive index for a positive lens. If the back focus of the master lens ML is short and an optical path length in which a lens is to be arranged is short in this case, it is difficult to arrange a lens required for correction, and thus the effect of the improvement may be insufficient, or otherwise it is likely to be difficult to correct the chromatic aberration.

To deal with this, in the rear attachment lens of each example, as illustrated in the bottom diagram in FIG. 17, the rear attachment lens EL is set such that the negative and positive refractive powers are arranged in this order from the object side to the image side. Additionally, an interval between the front principal point and the rear principal point of the rear attachment lens EL is increased and the rear principal point is greatly moved toward the object side such that the refractive power of the rear attachment lens EX is weakened (focal length is increased). This makes it possible to easily correct the Petzval sum for the rear attachment lens having a long back focus.

In order to achieve the configuration of the rear attachment lens EL with the refractive power arrangement illustrated in the bottom diagram in FIG. 17, the positive lens Lr is arranged closest to the image side and is arranged as close as possible to the image position img.

The rear attachment lens EL includes the positive lens Lr that is arranged closest to the image side, and the positive lens Lr has a shape convex toward the image side. fe represents the focal length of the rear attachment lens EL, and βe represents the magnification of the rear attachment lens EL obtained when the rear attachment lens EL is attached to the master lens ML. Then, np2 represents a distance from the last lens surface to the rear principal point position in the rear attachment lens EL attached to the master lens ML. Under the above terms, the following conditional expression is satisfied:

$$|fe|/(fe\times(1-\beta e)+np2)>9 \quad (1).$$

The denominator component of Conditional Expression (1) corresponds to the sum of a paraxial back focus and the rear principal point position and indicates an approximate back focus. When the value falls below the lower limit value in Conditional Expression (1), it is difficult to decrease the Petzval sum.

Such arrangement of the refractive powers makes it easy to change the refractive power of the rear attachment lens EL from the original negative to weak positive, and thus the focal length fe is an absolute value.

In one embodiment, a numerical range of Conditional Expression (1) may be set as follow:

$$|fe|/(fe(1-\beta e)+np2)>18 \quad (1a).$$

In one embodiment, each example may satisfy one or more of the following conditional expressions.

R1 represents a curvature radius of a lens surface on the object side of the positive lens Lr arranged at the image side, R2 represents a curvature radius of a lens surface on the image side of the positive lens Lr. φr represents an effective diameter of the positive lens Lr. Under the above terms, the focal length fe is fe (mm), and the distance np2 is np2 (mm). De represents a lens thickness (a length from a first lens surface to the image plane) of the rear attachment lens EL. BF represents the back focus obtained with an image pickup optical system including the master lens ML and the rear attachment lens EL detachably attached on the image side of the master lens ML.

When an image pickup apparatus including the image pickup optical system and the image pickup element that receives light of an image formed by the image pickup optical system is used, φr represents the effective diameter of the positive lens Lr, and Yi represents the maximum image height obtained when the rear attachment lens EL is attached to the master lens ML. Then, φ1 represents an effective diameter of the positive lens that is closest to the object side of the rear attachment lens EL. Under the above terms, in one embodiment, one or more of the following conditional expressions are satisfied:

$$-5.00<(R2+R1)/(R2-R1)<-0.85 \quad (2);$$

$$1.8<\varphi r/(fe\times(1-\beta e)+np2)<20.0 \quad (3);$$

$$-5<1000\ (mm)/(fe+np2)<5 \quad (4);$$

$$-4<1000\ (mm)/(fe\times\beta e)<4 \quad (5);$$

$$|fe/De|>2 \quad (6);$$

$$|fe/BF|>9 \quad (7);$$

$$1.8<\varphi r/Yi<2.2 \quad (8); \text{ and}$$

$$1.85<\varphi 1\times\beta e/Yi<3.00 \quad (9).$$

Next, technical meanings of the above-described conditional expressions are described.

When the lens shape of the positive lens Lr that is closest to the image side is set within a range of Conditional Expression (2), it is easy to move the position of the principal point closer to the image side by the positive lens Lr itself, and thus it is easier to achieve proper refractive power arrangement. When the value exceeds the upper limit value in Conditional Expression (2), the principal point is likely to be positioned at the object side and the positive lens Lr is likely to be thick, and thus it is unpreferable. When the value falls below the lower limit value in Conditional Expression (2), the curvature of the lens surface on the image side is too strong and many coma aberrations are likely to occur on a top ray of peripheral light, and thus it is unpreferable.

In each Example, since the positive lens Lr is arranged at the image side, the positive lens Lr has a large effective diameter φr to collect the peripheral light. When the value falls below the lower limit value in Conditional Expression (3), it is difficult to secure a certain amount of the peripheral light required for the combination with the master lens ML having a long distance from the image plane to the exit pupil. When the value exceeds the upper limit value in Conditional Expression (3), the positive lens Lr is too thick, and thus it is unpreferable. Additionally, since the effective diameter φr also is to be within a mount member connecting the lens unit and the camera, the configuration of the aspect of the embodiments has the relatively large effective diameter φr for implementation with a mount having a large aperture.

The denominator of Conditional Expression (4) indicates the rear focal position, and when the denominator is set within a numerical range satisfying Conditional Expression (4), it is possible to weaken the refractive power of the rear attachment lens EL, and thus the Petzval sum is decreased easily. When the value falls below the lower limit value in Conditional Expression (4), the Petzval sum is likely to remain on the negative side, while when the value exceeds the upper limit value in Conditional Expression (4), the correction is made excessively, and the Petzval sum is likely to remain on the positive side, which are both unpreferable.

When the magnification of the rear attachment lens EL is increased, the negative refractive power is to be increased to gain the magnification; however, it is possible to correct the Petzval sum well by setting the value within the numerical range of Conditional Expression (5). When the value exceeds the upper limit value in Conditional Expression (5), the Petzval sum is likely to be corrected excessively, while when the value falls below the lower limit value in Conditional Expression (5), the correction is likely to be insufficient, and thus they are both unpreferable.

In order to attach the rear attachment lens EL to the master lens ML having the short back focus, the optical path length is to be shortened in proportion to the short back focus. Thus, the lens thickness De is likely to be small. In view of this, the correction of the Petzval sum is facilitated by setting the focal length of the rear attachment lens EL within the numerical range of Conditional Expression (6). When the value falls below the lower limit value in Conditional Expression (6), it is difficult to secure a back focus having the required length, or the back focus of the master lens ML is to be increased, and thus it is unpreferable.

Increase of the focal length fe is facilitated by shortening the back focus BF to make the positive lens Lr that is closest to the image side much closer to the image side. Thus, a favorable field curvature can be obtained easily by setting the value within the numerical range of Conditional Expression (7). When the value falls below the lower limit value in Conditional Expression (7), the correction of the Petzval sum is insufficient or is excessive, and thus it is unpreferable.

When the value falls below the lower limit value in Conditional Expression (8), the rear attachment lens EL attached to the master lens ML having a long distance from the image plane to the exit pupil are likely to cause vignetting of the peripheral light, which is unpreferable. When the value exceeds the upper limit value in Conditional Expression (8), the lens thickness is increased excessively, and it is unpreferable.

Figure 21:
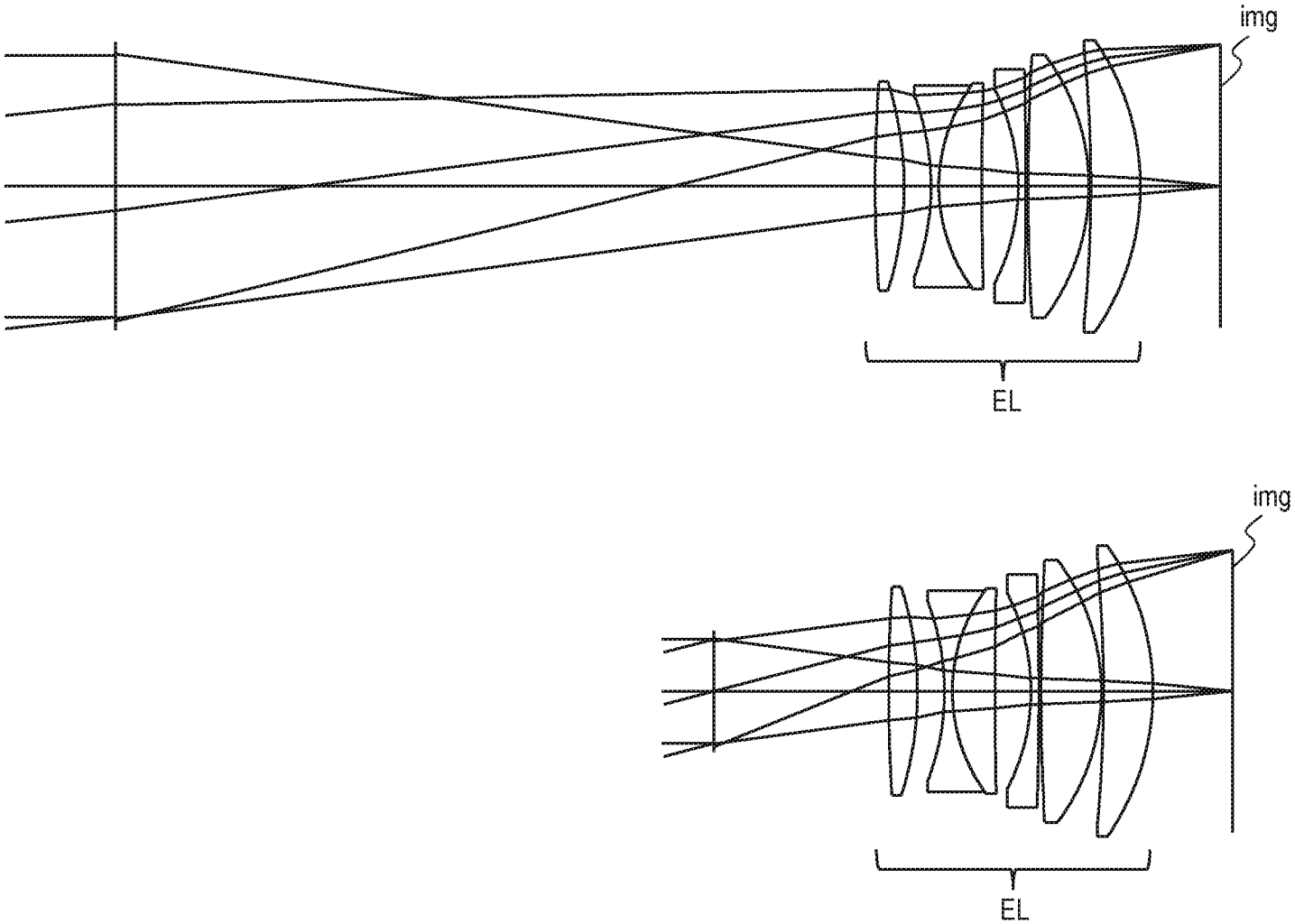
FIG. 21 is an optical path diagram illustrating a relationship between an exit pupil of the master lens and the rear attachment lens.

When the master lens ML has a long distance from the image plane to the exit pupil, it is impossible to collect the peripheral light without the sufficiently large effective diameter of the positive lens L1 that is closest to the object side as illustrated in a top diagram in FIG. 21. On the contrary, when the master lens ML has a short distance from the image plane to the exit pupil, it is possible to make the effective diameter of the positive lens L1 that is closest to the object side small as illustrated in a bottom diagram in FIG. 21. Thus, when the value falls below the lower limit value in Conditional Expression (9), an amount of the peripheral light is decreased when the master lens ML having the long distance from the image plane to the exit pupil is attached, and thus it is unpreferable. When the value exceeds the upper limit value in Conditional Expression (9), the positive lens L1 is too thick, and it is difficult to obtain the required magnification.

In one embodiment, the numerical ranges of Conditional Expressions (2) to (9) may be set as follow:

$$-5.00<(R2+R1)/(R2-R1)<-0.87 \quad (2a);$$

$$2.1<\varphi r/(fe\times(1-\beta e)+np2)<20.0 \quad (3a);$$

$$-3<1000\ (mm)/(fe+np2)<3 \quad (4a);$$

$$-2<1000\ (mm)/(fe\times\beta e)<2 \quad (5\ a);$$

$$|fe/De|>4.8 \quad (6a);$$

$$|fe/BF|>18 \quad (7a);$$

$$1.85<\varphi r/Yi<2.10 \quad (8a);\ \text{and}$$

$$1.82<\varphi 1\times\beta e/Yi<2.50 \quad (9a).$$

Figure 22:
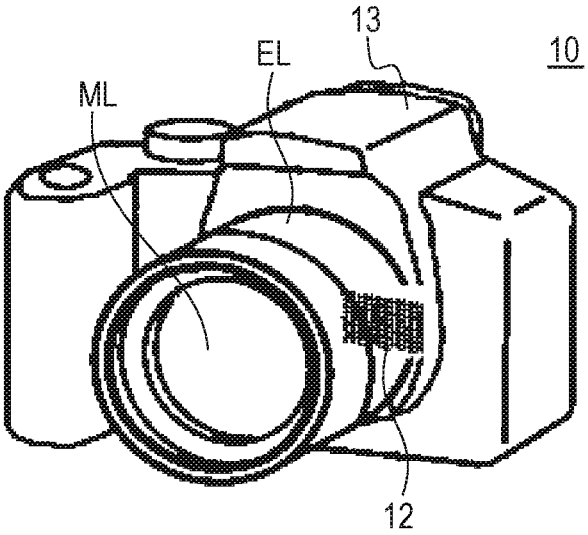
FIG. 22 is a schematic diagram illustrating a configuration of an image pickup apparatus (digital camera).
Figure 22:
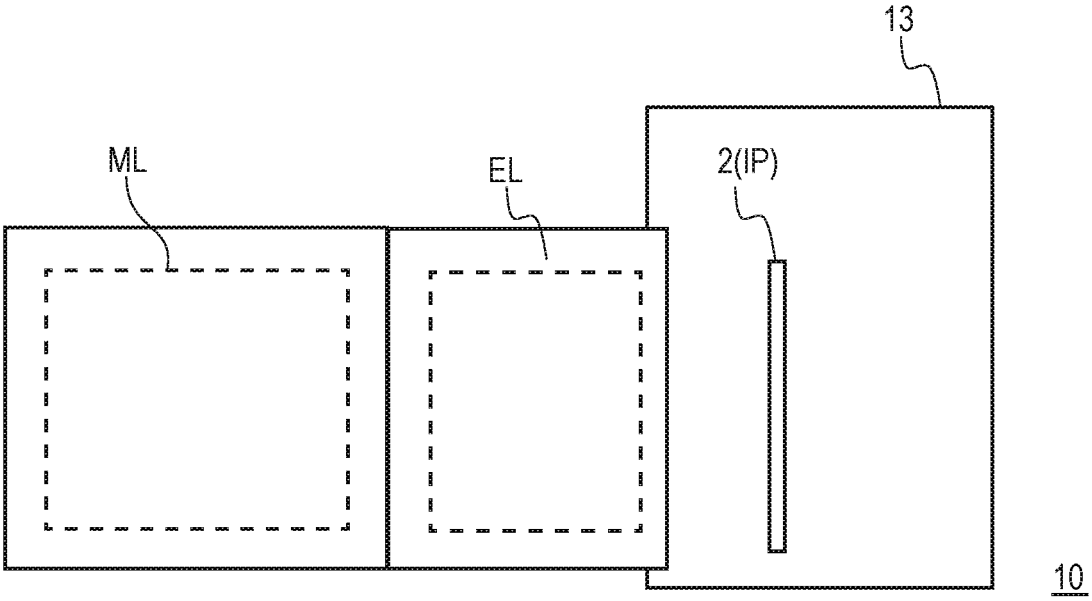

FIG. 22 is a schematic diagram illustrating a configuration of an image pickup apparatus (digital camera) 10. A top diagram in FIG. 22 is a perspective view, and a bottom diagram in FIG. 22 is a side view. The image pickup apparatus 10 includes a camera body 13, the master lens ML, and the rear attachment lens EL similar to any one of the above-described Examples 1 to 8. Additionally, the image pickup apparatus 10 includes a light-receiving element (image pickup element) 12 that photoelectrically converts an image formed by the master lens ML and the rear attachment lens EL.

An image pickup element such as a CCD sensor and a CMOS sensor may be used as the light-receiving element 12. The master lens ML and the rear attachment lens EL may be integrally formed with the camera body 13, or may be each formed to be detachable from the camera body 13. When the master lens ML and the rear attachment lens EL are integrally formed with the camera body 13, the rear attachment lens EL is formed so as to be insertable and detachable on the optical axis.

Although examples of the disclosure are described above, the disclosure is not limited to these examples, and various modifications and changes are available without departing from the gist.

Hereinafter, numerical examples of the rear attachment lenses EL of Examples 1 to 8 and a numerical example of the master lens ML to which the rear attachment lens EL of the aspect of the embodiments is attached are shown.

i represents the order counted from the object side. In each numerical example, Bi represents an i-th lens unit, and Si represents an i-th surface. EAi represents an effective diameter of the i-th surface, Ri represents a curvature radius of the i-th surface, di represents a surface interval between the i-th surface and an (i+1)-th surface. ndi and vdi respectively represent a refractive index for the d-line (wavelength of 587.56 nm) an Abbe number based on the d-line of a medium between the i-th surface and the (i+1)-th surface. A surface having a surface number marked with s on the left side indicates a position of the aperture stop.

A lens surface having a surface number marked with* (asterisk) on the right side indicates that the lens surface has an aspherical shape according to the following function, and the coefficients are indicated in the numerical examples. y represents a coordinate in a radial direction based on a surface vertex of the lens surface, and x represents a coordinate in an optical axis direction based on the surface vertex of the lens surface. A, B, C, and D are aspherical coefficients:

$$x=(y^2/R)/[1+\{1-(1+K)(y^2/R^2)\}^{1/2}]+Ay^4+By^6+Cy^8+Dy^{10}.$$

In the rear attachment lens EL, values of the focal length f and the F-value F are values obtained when an object distance is infinite. A total lens length herein indicates a distance from the first lens surface to the imaging position. BF represents the back focus and is a distance from the lens plane having a refractive power that is closest to the image side to the image plane. When there is an element such as a flat plate that does not have a refractive power in the middle of the distance, the distance is an air-equivalent length that is calculated while not including such an element.

In each of the numerical examples of the rear attachment lens EL, a negative surface interval is put as the first lens surface, which indicates a distance from the imaging position of the master lens ML to the first lens surface of the rear attachment lens EL. When the rear attachment lens EL is attached to the master lens ML, the values are subsequently inputted like Numerical Example 1.

In the master lens ML of the numerical example, a distance from the image plane to the exit pupil is designed to be −106 mm and is a relatively long value among that of image pickup optical systems for mirrorless cameras having short back focuses BF. The back focus BF of the master lens ML is set 35 mm in terms of the performance and the versatility of the rear attachment lens EL.

The rear attachment lens EL of each of Examples 1 to 6 is adapted to a full-size sensor and is optimized for an ideal optical system in which a distance from the image plane to the exit pupil is 100 mm. The confirmation of the optical performance may be attached to the above-described master lens ML or may be mounted on the ideal optical system having the distance of 100 mm Although the initial F-value of the master lens ML is F2, depending on the F-value supported by the rear attachment lens EL, in one embodiment, the master lens ML with the stop thereof narrowed is used to a stop diameter listed in the numerical example.

Examples 1 to 6 of the rear attachment lens EL are made with variations of the magnification, the supported F-value, and the minimum back focus of the master lens, and Examples 7 and 8 indicate values in the case of design for a smaller sensor size. In Examples 7 and 8, the rear attachment lens EL is optimized for the ideal optical system having the distance of 50 mm to conform to the sensor size, but still achieves a sufficient light amount even when being attached to the master lens ML.

In Numerical Example 1, surface numbers s1 to s26 correspond to the master lens ML, and surface numbers s27 to s38 correspond to the rear attachment lens EL. The surface number s11 corresponds to the aperture stop. The surface number s27 corresponds to a dummy surface used only for designing.

In Numerical Example 1, the magnification is 1.4, and the F-value supported by the master lens ML is 2.8 (F-number in the case of using master lens ML together is F4.0), and the usage is assumed in which the effective diameter of the surface number s is narrowed to φ23.0.

It is assumed that the first lens surface of the rear attachment lens EL is arranged in a position distanced by −33 mm from the imaging position of the master lens ML, and has a clearance (interval) from the master lens ML of 2 mm in that condition.

Each of Numerical Examples 2 to 8 indicates only the rear attachment lens EL, which is assumed to be attached to the master lens ML of the surface numbers s1 to s26 of Numerical Example 1. In Numerical Example 2, the magnification is 2.0, and the F-value supported by the master lens ML is 2.0 (F-number in the case of using the master lens ML together is F2.8), and Numerical Example 2 is applied to the master lens ML having a large aperture.

When Numerical Example 2 is applied to the large aperture lens, since the field curvature is usually varied in the periphery even if the Petzval sum is decreased, the correction is made easy by using an aspherical lens. In Numerical Example 2, an aspherical lens is used in the surface number 3.

Additionally, in Numerical Example 2, the refractive power is inversed to be a weak positive refractive power. In this case, the sign of the distance np2 from the last lens surface to the rear principal point is inversed to have a positive value. The same applies to Numerical Examples 3 to 8 like Numerical Example 2.

(Numerical Example of Master Lens)

| B | S OBJ | EA | R | d 1E+30 | glass | nd | vd |
|---|---|---|---|---|---|---|---|
| 1 | 1 | 52.60 | 89.7804 | 7.0000 | SLAH96 | 1.76385 | 48.49 |
| | 2 | 51.69 | −430.9980 | 0.5000 | | | |
| | 3 | 46.32 | 48.3018 | 9.6000 | SFPM3 | 1.53775 | 74.70 |
| | 4 | 44.77 | −136.5166 | 1.8000 | SNBH56 | 1.85478 | 24.80 |
| | 5 | 41.83 | 141.7310 | 4.0272 | | | |
| 2 | 6 | 39.28 | 342.7978 | 5.0000 | SNPH4 | 1.89286 | 20.36 |
| | 7 | 38.15 | −104.6205 | 1.5000 | SBSL7 | 1.51633 | 64.14 |
| | 8 | 32.92 | 30.4224 | 6.0000 | | | |
| | 9 | 32.90 | −125.4496 | 1.5000 | STIM8 | 1.59551 | 39.24 |
| | 10 | 32.47 | 91.3223 | 14.1566 | | | |
| 3 | s11 | 32.84 | (Stop) | 2.0000 | | | |
| | 12 | 33.11 | −4e+010 | 4.0000 | TAFD35 | 1.91082 | 35.25 |
| | 13 | 33.17 | −92.1494 | 2.3500 | | | |
| | 14 | 33.09 | −39.9735 | 2.5000 | STIH10 | 1.72825 | 28.46 |
| | 15 | 34.03 | −85.4438 | 13.2476 | | | |
| 4 | 16 | 35.22 | 184.1552 | 4.6000 | SLAH96 | 1.76385 | 48.49 |
| | 17 | 35.17 | −68.0760 | 0.5000 | | | |
| | 18 | 33.00 | 44.4430 | 7.4000 | SFPM3 | 1.53775 | 74.70 |
| | 19 | 32.37 | −57.1397 | 1.5000 | STIH6 | 1.80518 | 25.42 |
| | 20 | 32.09 | −159.1922 | 1.0000 | | | |
| 5 | 21 | 30.91 | 301.3443 | 1.5000 | SNBH52 | 1.67300 | 38.15 |
| | 22 | 29.87 | 31.5275 | 18.2616 | | | |
| | 23 | 34.00 | −30.8186 | 1.5000 | SNSL36 | 1.51742 | 52.43 |
| | 24 | 37.76 | −130.0211 | 0.5000 | | | |
| | 25 | 39.73 | 1275.4399 | 6.5000 | TAFD35 | 1.91082 | 35.25 |
| | 26 | 40.64 | −49.8300 | 35.0000 | | | |
| | Ext img | | | | | | |

| | Infinity | Intermediate | Closest |
|---|---|---|---|
| Focal length | 100.15 | 100.04 | 95.86 |
| F-number | 2.00 | 2.00 | 2.80 |
| Angle of view | 12.19 | 12.20 | 12.72 |
| Image height | 21.63 | 21.63 | 21.63 |
| Total lens length | 118.44 | 118.44 | 118.44 |
| BF | 35.00 | 35.00 | 35.00 |
| Object distance (OBJ) | 1e+015 | 4845.07 | 231.23 |
| d5 | 4.027 | 4.327 | 15.154 |
| d10 | 14.157 | 13.856 | 3.030 |
| d15 | 13.248 | 12.780 | 2.905 |
| d20 | 1.000 | 1.467 | 11.343 |
| d26 | 35.000 | 35.000 | 35.376 |
| Aperture diameter (F2) | 32.8 | 32.8 | 27.2 |
| Aperture diameter(F2.8) | 23.0 | 23.0 | 19.4 |

-continued

| Unit Data | | | |
|---|---|---|---|
| Unit | First surface | Last surface | Focal length |
| B1 | 1 | 5 | 70.9504 |
| B2 | 6 | 10 | −44.4358 |
| B3 | 11 | 15 | 1954.0227 |
| B4 | 16 | 20 | 36.5660 |
| B5 | 21 | 26 | −137.5262 |

(Numerical Example 1) (Master Lens) + (Rear Attachment Lens)
f = 140.08 F = 4.00 angle = 8.78 Y = 21.635

| B | S OBJ | EA | R | d 1E+30 | glass | nd | vd |
|---|---|---|---|---|---|---|---|
| 1 | 1 | 52.60 | 89.7804 | 7.0000 | SLAH96 | 1.76385 | 48.49 |
| | 2 | 51.69 | −430.9980 | 0.5000 | | | |
| | 3 | 46.32 | 48.3018 | 9.6000 | SFPM3 | 1.53775 | 74.70 |
| | 4 | 44.77 | −136.5166 | 1.8000 | SNBH56 | 1.85478 | 24.80 |
| | 5 | 41.83 | 141.7310 | 4.0272 | | | |
| 2 | 6 | 39.28 | 342.7978 | 5.0000 | SNPH4 | 1.89286 | 20.36 |
| | 7 | 38.15 | −104.6205 | 1.5000 | SBSL7 | 1.51633 | 64.14 |
| | 8 | 32.92 | 30.4224 | 6.0000 | | | |
| | 9 | 32.90 | −125.4496 | 1.5000 | STIM8 | 1.59551 | 39.24 |
| | 10 | 32.47 | 91.3223 | 14.1566 | | | |
| 3 | s11 | 23.00 | 1e+018 | 2.0000 | | | |
| | 12 | 33.11 | −4e+010 | 4.0000 | TAFD35 | 1.91082 | 35.25 |
| | 13 | 33.17 | −92.1494 | 2.3500 | | | |
| | 14 | 33.09 | −39.9735 | 2.5000 | STIH10 | 1.72825 | 28.46 |
| | 15 | 34.03 | −85.4438 | 13.2476 | | | |
| 4 | 16 | 35.22 | 184.1552 | 4.6000 | SLAH96 | 1.76385 | 48.49 |
| | 17 | 35.17 | −68.0760 | 0.5000 | | | |
| | 18 | 33.00 | 44.4430 | 7.4000 | SFPM3 | 1.53775 | 74.70 |
| | 19 | 32.37 | −57.1397 | 1.5000 | STIH6 | 1.80518 | 25.42 |
| | 20 | 32.09 | −159.1922 | 1.0000 | | | |
| 5 | 21 | 30.91 | 301.3443 | 1.5000 | SNBH52 | 1.67300 | 38.15 |
| | 22 | 29.87 | 31.5275 | 18.2616 | | | |
| | 23 | 34.00 | −30.8186 | 1.5000 | SNSL36 | 1.51742 | 52.43 |
| | 24 | 37.76 | −130.0211 | 0.5000 | | | |
| | 25 | 39.73 | 1275.4399 | 6.5000 | TAFD35 | 1.91082 | 35.25 |
| | 26 | 40.64 | −49.8300 | 35.0000 | | | |
| 6 | 27 | 60.00 | 1e+018 | −33.0000 | | | |
| | 28 | 29.62 | 232.6593 | 4.5000 | STIM28 | 1.68893 | 31.07 |
| | 29 | 29.57 | −51.6795 | 4.1500 | | | |
| | 30 | 27.76 | −37.9548 | 1.2000 | SLAH65VS | 1.80400 | 46.53 |
| | 31 | 28.56 | 26.1818 | 6.6000 | SNBH5 | 1.65412 | 39.68 |
| | 32 | 29.15 | 579.4296 | 5.6000 | | | |
| | 33 | 29.89 | −32.2186 | 1.2000 | TAFD45 | 1.95375 | 32.32 |
| | 34 | 33.22 | −590.9164 | 0.3000 | | | |
| | 35 | 34.81 | 338.0844 | 9.4000 | SNSL36 | 1.51742 | 52.43 |
| | 36 | 37.48 | −32.9619 | 0.3000 | | | |
| | 37 | 40.66 | −211.2193 | 7.6500 | SBSL7 | 1.51633 | 64.14 |
| | 38 | 41.83 | −38.7354 | 12.2814 | | | |
| | img | | | | | | |

(Numerical Example 2) (Rear Attachment Lens)
f = 139.80 F = 2.80 angle = 8.80 Y = 21.635

| B | S | EA | R | d | glass | nd | vd |
|---|---|---|---|---|---|---|---|
| 6 | 1 | 60.00 | ∞ | −34.0000 | | | |
| | 2 | 30.02 | 115.9877 | 3.6000 | LTIM28 | 1.68948 | 31.02 |
| | 3* | 29.86 | −160.8553 | 3.6500 | | | |
| | 4 | 28.67 | −129.2898 | 1.0000 | TAFD30 | 1.88300 | 40.80 |
| | 5 | 28.24 | 22.9193 | 7.7000 | STIM28 | 1.68893 | 31.07 |
| | 6 | 28.52 | −325.2307 | 8.0000 | | | |
| | 7 | 28.93 | −23.4773 | 1.2000 | TAFD55 | 2.00100 | 29.13 |
| | 8 | 32.88 | −112.2037 | 2.3000 | | | |
| | 9 | 35.94 | −118.3406 | 8.4000 | SFSL5 | 1.48749 | 70.24 |
| | 10 | 38.42 | −29.0088 | 0.2000 | | | |
| | 11 | 42.26 | −124.1290 | 6.6000 | TAFD30 | 1.88300 | 40.80 |

-continued (Numerical Example 2) (Rear Attachment Lens)
f = 139.80 F = 2.80 angle = 8.80 Y = 21.635

| B | S | EA | R | d | glass | nd | vd |
|---|---|---|---|---|---|---|---|
| | 12 | 43.56 | −43.0690 | 10.7705 | | | |
| | img | | | | | | |

Aspherical surface 3 r = −1.60855e+002
K = 0.00000e+000
A = −2.16358e−006
B = 1.24978e−009
C = −9.69077e−012
D = 2.00404e−014

(Numerical Example 3) (Rear Attachment Lens)
f = 200.25 F = 5.72 angle = 6.17 Y = 21.635

| B | S | EA | R | d | glass | nd | vd |
|---|---|---|---|---|---|---|---|
| 6 | 1 | 60.00 | 1e+018 | −33.0000 | | | |
| | 2 | 23.18 | 308.4763 | 1.0000 | SLAH89 | 1.85150 | 40.78 |
| | 3 | 22.89 | 18.0290 | 7.2000 | SNBH8 | 1.72047 | 34.71 |
| | 4 | 23.00 | −54.3214 | 7.5000 | | | |
| | 5 | 21.57 | −30.5683 | 1.2000 | SLAH65VS | 1.80400 | 46.53 |
| | 6 | 22.89 | 24.3680 | 9.4000 | SNBH5 | 1.65412 | 39.68 |
| | 7 | 23.77 | −19.5554 | 1.0000 | | | |
| | 8 | 23.26 | −19.3709 | 1.2000 | TAFD45 | 1.95375 | 32.32 |
| | 9 | 26.55 | 58.7309 | 8.5000 | STIM2 | 1.62004 | 36.26 |
| | 10 | 28.40 | −24.7449 | 0.3000 | | | |
| | 11 | 29.30 | −46.1174 | 1.5000 | SLAM2 | 1.74400 | 44.79 |
| | 12 | 31.60 | 172.0800 | 8.0000 | | | |
| | 13 | 40.24 | 800.0000 | 12.5000 | SBSL7 | 1.51633 | 64.14 |
| | 14 | 42.26 | −28.7639 | 10.7751 | | | |
| | img | | | | | | |

(Numerical Example 4) (Rear Attachment Lens)
f = 200.17 F = 4.00 angle = 6.17 Y = 21.635

| B | S | EA | R | d | glass | nd | vd |
|---|---|---|---|---|---|---|---|
| 6 | 1 | 60.00 | 1e+018 | −31.0000 | | | |
| | 2 | 22.62 | 61.7715 | 3.1500 | SNBH56 | 1.85478 | 24.80 |
| | 3 | 22.24 | −848.1440 | 2.5000 | | | |
| | 4 | 21.05 | 96.5357 | 1.0000 | SLAH58 | 1.88300 | 40.76 |
| | 5 | 19.90 | 16.3502 | 0.9500 | | | |
| | 6 | 20.86 | 18.0000 | 8.8000 | STIM25 | 1.67270 | 32.10 |
| | 7 | 20.55 | −21.6503 | 1.0000 | TAFD45 | 1.95375 | 32.32 |
| | 8 | 20.83 | 65.0179 | 2.5000 | | | |
| | 9 | 21.22 | −71.2082 | 1.0000 | SLAH58 | 1.88300 | 40.76 |
| | 10 | 22.81 | 28.3480 | 11.0000 | STIM8 | 1.59551 | 39.24 |
| | 11 | 25.47 | −20.0000 | 1.5000 | TAFD45 | 1.95375 | 32.32 |
| | 12 | 30.67 | 423.6680 | 1.2000 | | | |
| | 13 | 33.32 | 1073.8356 | 9.8000 | STIL6 | 1.53172 | 48.84 |
| | 14 | 36.30 | −26.6847 | 0.2000 | | | |
| | 15 | 40.75 | −96.2909 | 11.0000 | SBSL7 | 1.51633 | 64.14 |
| | 16 | 42.95 | −27.9384 | 10.6865 | | | |
| | img | | | | | | |

(Numerical Example 5) (Rear Attachment Lens)
f = 200.20 F = 4.00 angle = 6.17 Y = 21.635

| B | S | EA | R | d | glass | nd | vd |
|---|---|---|---|---|---|---|---|
| 6 | 1 | 21.70 | 1e+018 | −32.0000 | | | |
| | 2 | 22.80 | 81.5499 | 3.2000 | STIM5 | 1.60342 | 38.03 |
| | 3 | 22.54 | −159.2407 | 0.7500 | | | |
| | 4 | 22.03 | 105.8002 | 1.0000 | SLAH58 | 1.88300 | 40.76 |
| | 5 | 20.79 | 14.3718 | 9.2000 | STIM25 | 1.67270 | 32.10 |
| | 6 | 20.66 | −31.2980 | 1.0000 | SLAH58 | 1.88300 | 40.76 |
| | 7 | 20.81 | 85.1104 | 8.8000 | | | |
| | 8 | 22.76 | −38.2927 | 1.0000 | SLAH58 | 1.88300 | 40.76 |
| | 9 | 24.38 | 84.3201 | 10.5000 | STIM8 | 1.59551 | 39.24 |
| | 10 | 26.62 | −18.0000 | 1.2000 | TAFD45 | 1.95375 | 32.32 |
| | 11 | 31.78 | −132.5183 | 2.6000 | | | |
| | 12 | 32.61 | −45.0059 | 6.0000 | SLAL12 | 1.67790 | 55.34 |
| | 13 | 35.72 | −27.6032 | 0.2000 | | | |
| | 14 | 41.93 | −514.9956 | 10.8000 | SBAL42 | 1.58313 | 59.37 |
| | 15 | 43.50 | −31.5822 | 10.6679 | | | |
| | img | | | | | | |

(Numerical Example 6) (Rear Attachment Lens)
f = 200.17 F = 4.00 angle = 6.17 Y = 21.635

| B | S | EA | R | d | glass | nd | vd |
|---|---|---|---|---|---|---|---|
| 6 | 1 | 60.00 | 1e+018 | −32.0000 | | | |
| | 2 | 23.09 | 65.1772 | 3.2000 | STIM28 | 1.68893 | 31.07 |
| | 3 | 22.87 | −74.4145 | 3.2000 | | | |
| | 4 | 21.12 | −70.2712 | 1.0000 | TAFD32 | 1.87070 | 40.73 |
| | 5 | 20.44 | 16.7212 | 6.0000 | STIM28 | 1.68893 | 31.07 |
| | 6 | 20.49 | 729.0121 | 2.4000 | | | |
| | 7 | 20.54 | −38.2802 | 1.0000 | TAFD37 | 1.90043 | 37.37 |
| | 8 | 21.88 | 27.9778 | 9.0000 | STIM2 | 1.62004 | 36.26 |
| | 9 | 23.19 | −18.0000 | 0.8000 | | | |
| | 10 | 23.13 | −16.6181 | 1.5000 | TAFD55 | 2.00100 | 29.13 |
| | 11 | 28.18 | 3765.6048 | 0.8000 | | | |
| | 12 | 29.22 | −324.5649 | 10.0000 | STIM8 | 1.59551 | 39.24 |
| | 13 | 33.26 | −23.7687 | 7.6000 | | | |
| | 14 | 42.46 | −107.3812 | 10.0000 | SBSL7 | 1.51633 | 64.14 |
| | 15 | 44.03 | −30.0000 | 14.5496 | | | |
| | img | | | | | | |

(Numerical Example 7) (Rear Attachment Lens)
f = 140.05 F = 4.00 angle = 5.57 Y = 13.650

| B | S | EA | R | d | glass | nd | vd |
|---|---|---|---|---|---|---|---|
| 6 | 1 | 60.00 | 1e+018 | −22.0000 | | | |
| | 2 | 18.22 | 117.3822 | 3.5000 | STIM28 | 1.68893 | 31.07 |
| | 3 | 18.17 | −27.6401 | 2.1500 | | | |
| | 4 | 17.09 | −20.7062 | 1.0000 | SLAH65V | 1.80400 | 46.58 |
| | 5 | 17.71 | 15.5408 | 4.3000 | SNBH5 | 1.65412 | 39.68 |
| | 6 | 18.10 | −1362.5945 | 3.0000 | | | |
| | 7 | 18.49 | −21.3503 | 1.0000 | TAFD55 | 2.00100 | 29.13 |
| | 8 | 20.61 | 1e+004 | 0.2000 | | | |
| | 9 | 22.08 | 90.9319 | 6.0000 | SNSL36 | 1.51742 | 52.43 |
| | 10 | 23.32 | −19.8251 | 0.2000 | | | |
| | 11 | 24.49 | −44.2778 | 4.2000 | SLAL54 | 1.65100 | 56.16 |
| | 12 | 25.63 | −23.4041 | 10.7795 | | | |
| | img | | | | | | |

(Numerical Example 8) (Rear Attachment Lens)
f = 199.91 F = 5.60 angle = 3.91 Y = 13.650

| B | S | EA | R | d | glass | nd | vd |
|---|---|---|---|---|---|---|---|
| 6 | 1 | 60.00 | 1e+018 | −22.0000 | | | |
| | 2 | 15.13 | 56.8990 | 2.8000 | STIM28 | 1.68893 | 31.07 |
| | 3 | 14.88 | −44.8911 | 2.7000 | | | |
| | 4 | 13.53 | −35.1499 | 0.7000 | TAFD37 | 1.90043 | 37.37 |
| | 5 | 13.26 | 9.8306 | 5.0000 | STIH18 | 1.72151 | 29.23 |
| | 6 | 13.56 | 262.0958 | 1.8000 | | | |
| | 7 | 13.64 | −17.1933 | 0.7000 | TAFD45 | 1.95375 | 32.32 |
| | 8 | 15.42 | 25.3307 | 6.2000 | STIM35 | 1.69895 | 30.13 |
| | 9 | 17.31 | −16.2429 | 3.2000 | | | |
| | 10 | 19.02 | −25.3265 | 1.0000 | TAFD45 | 1.95375 | 32.32 |
| | 11 | 21.14 | 97.0709 | 6.0000 | SBSL7 | 1.51633 | 64.14 |
| | 12 | 23.69 | −27.9646 | 0.3000 | | | |
| | 13 | 26.56 | 369.1436 | 9.0000 | SFSL5 | 1.48749 | 70.24 |
| | 14 | 28.27 | −20.0000 | 10.5000 | | | |
| | img | | | | | | |

Values relevant to the conditional expressions of the examples are listed in the Table 1.

TABLE 1

| | Example | | | | | | | |
|---|---|---|---|---|---|---|---|---|
| | 1 | 2 | 3 | 4 | 5 | 6 | 7 | 8 |
| Magnification βe of rear attachment lens EL | 1.4 | 1.4 | 2 | 2 | 2 | 2 | 1.4 | 2 |
| F-value of master lens ML | F2.8 | F2.0 | F2.8 | F2.0 | F2.0 | F2.8 | F2.8 | F2.8 |
| F-value in case of combination | F4 | F2.8 | F5.7 | F4.1 | F4.1 | F5.7 | F4 | F5.7 |
| Minimum back focus mb | −33 | −34 | −33 | −31 | −32 | −32 | −22 | −22 |
| Image height Yi | 21.63 | 21.63 | 21.63 | 21.63 | 21.63 | 21.63 | 13.65 | 13.65 |
| Focal length fe | −821 | 500 | −491 | 1528 | 711 | 521 | −400 | 500 |
| Lens length De | 40.9 | 42.7 | 59.3 | 55.6 | 56.3 | 56.5 | 25.6 | 39.4 |
| Back focus BF | 12.3 | 10.8 | 10.8 | 10.7 | 10.7 | 14.6 | 10.8 | 10.5 |
| Object side principal point position np1 | −201.1 | 175.8 | −212.4 | 794.4 | 387.1 | 292.3 | −92.0 | 271.5 |
| Rear principal point position np2 | −315.2 | 208.7 | −479.9 | 1536.5 | 720.4 | 534.6 | −148.6 | 508.4 |
| Conditional Expression (1) \|fe\|/(fe(1 − βe) + np2) | 61.6 | 57.5 | 44.5 | 177.7 | 71.6 | 38.8 | 35.0 | 58.5 |
| Conditional Expression (2) (R2 + R1)/(R2 − R1) | −1.45 | −2.06 | −0.93 | −1.69 | −1.13 | −1.78 | −3.24 | −0.90 |
| Conditional Expression (3) φr/(fe(1 − βe) + np2) | 3.14 | 5.00 | 3.83 | 4.97 | 4.38 | 3.16 | 2.24 | 3.11 |
| Conditional Expression (4) 1000/(fe + np2) | −0.88 | 1.41 | −1.03 | 0.33 | 0.70 | 0.95 | −1.82 | 0.99 |
| Conditional Expression (5) 1000/(fe*βe) | −0.87 | 1.43 | −1.02 | 0.33 | 0.70 | 0.96 | −1.79 | 1.00 |
| Conditional Expression (6) \|fe/De\| | 20.1 | 11.7 | 8.3 | 27.5 | 12.6 | 9.2 | 15.7 | 12.7 |
| Conditional Expression (7) \|fe/BF\| | 66.9 | 46.4 | 45.6 | 142.9 | 66.6 | 35.8 | 37.1 | 47.6 |
| Conditional Expression (8) φr/Yi | 1.93 | 2.01 | 1.95 | 1.98 | 2.01 | 1.96 | 1.89 | 1.96 |
| Conditional Expression (9) φ1*βe/Yi | 1.92 | 1.94 | 2.14 | 2.09 | 2.11 | 2.14 | 1.89 | 2.24 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-073253, filed Apr. 8, 2019, which is hereby incorporated by reference herein in its entirety.

What is claimed is:

1. A rear attachment lens [configured to vary a focal length of a system by being attached to an image side of a] *attachable to an image side of a master lens to form a system having an increased focal length as compared to a focal length of the* master lens, comprising:

a *first* positive lens*, a first negative lens, a second positive lens, a second negative lens, a third positive lens, and a fourth positive lens* arranged [closest] *in order from an object side* to the image side,

*wherein the fourth positive lens is arranged closest to the image side,* wherein a lens surface on the image side of the *fourth* positive lens has a shape convex toward the image side, and wherein the following conditional expression is satisfied:

$$|fe|/(fe\times(1-\beta e)+np2)>9,$$

where fe represents a focal length of the rear attachment lens, βe represents a magnification of the rear attachment lens when attached to the master lens, and np2 represents a distance from the lens surface on the image side of the *fourth* positive lens to a rear principal point position of the rear attachment lens when attached to the master lens.

2. The rear attachment lens according to claim 1, wherein the following conditional expression is satisfied:

$$-5.00<(R2+R1)/(R2-R1)<-0.85,$$

where R1 represents a curvature radius of a lens surface on an object side of the *fourth* positive lens, and R2 represents a curvature radius of the lens surface on the image side of the *fourth* positive lens.

3. The rear attachment lens according to claim 1, wherein the following conditional expression is satisfied:

$$1.8<\varphi r/(fe\times(1-\beta e)+np2)<20.0,$$

where φr represents an effective diameter of the *fourth* positive lens.

4. The rear attachment lens according to claim 1, wherein the following conditional expression is satisfied:

$$-5\ [[\mathrm{mm}]]<1000\ [mm]/(fe+np2)<5\ [[\mathrm{mm}]].$$

5. The rear attachment lens according to claim 1, wherein the following conditional expression is satisfied:

$$-4\ [[\mathrm{mm}]]<1000\ [mm]/(fe\times\beta e)<4\ [[\mathrm{mm}]].$$

6. The rear attachment lens according to claim 1, wherein the following conditional expression is satisfied:

$$|fe/De|>2,$$

where De represents a distance from [the] *a* lens surface [closest to the object side of the rear attachment lens] *on an object side of the first positive lens* to an image plane.

7. An image pickup apparatus, comprising:

a master lens;

the rear attachment lens according to claim 1; and an image pickup element that receives light from the rear attachment lens.

8. The image pickup apparatus according to claim 7, wherein the following conditional expression is satisfied:

$$1.8<\varphi r/Yi<2.2,$$

where φr represents an effective diameter of [a] *the fourth* positive lens, and Yi represents the maximum image height obtained when the rear attachment lens is attached to the master lens.

9. An optical system, comprising:

a master lens; and a rear attachment lens [configured to vary a focal length of the system by being attached to an image side] *attachable to an image side of a master lens to form a system having an increased focal length as compared to a focal length* of the master lens, wherein the rear attachment lens includes a *first* positive lens*, a first negative lens, a second positive lens, a second negative lens, a third positive lens, and a fourth positive lens,* arranged [closest] *in order from an object side* to the image side, wherein a lens surface on the image side of the *fourth* positive lens has a shape convex toward the image side, and wherein the following conditional expression is satisfied:

$$|fe/BF|>9,$$

where fe represents a focal length of the rear attachment lens, and BF represents a back focus obtained when the rear attachment lens is attached to the master lens.

10. An image pickup apparatus, comprising:

the optical system according to claim 9; and an image pickup element that receives light from the optical system, wherein the following conditional expression is satisfied:

$$1.8<\varphi r/Yi<2.2,$$

where φr represents an effective diameter of the *fourth* positive lens, and Yi represents the maximum image height obtained when the rear attachment lens is attached to the master lens.

11. The image pickup apparatus according to claim 10, wherein the following conditional expression is satisfied:

$$1.85<\varphi 1\times\beta e/Yi<3.00,$$

where φ1 represents the effective diameter of the *first* positive lens, and βe represents a magnification of the rear attachment lens when attached to the master lens.

*12. The rear attachment lens according to claim 1, wherein an air interval between the first positive lens and the first negative lens on an optical axis is wider than an air interval between the third positive lens and the fourth positive lens on the optical axis.*

*13. The optical system according to claim 9, wherein an air interval between the first positive lens and the first negative lens on an optical axis of the rear attachment lens is wider than an air interval between the third positive lens and the fourth positive lens on the optical axis of the rear attachment lens.*

*14. The rear attachment lens according to claim 1, wherein a lens surface on the object side of the first negative lens has a shape concave toward the object side.*

*15. The rear attachment lens according to claim 1, wherein a lens surface on the image side of the second positive lens has a shape convex toward the image side.*

*16. The optical system according to claim 9, wherein a lens surface on the object side of the first negative lens has a shape concave toward the object side of the rear attachment lens.*

*17. The optical system according to claim 9, wherein a lens surface on the image side of the second positive lens has a shape convex toward the image side of the rear attachment lens.*

*18. The rear attachment lens according to claim 1, wherein the following conditional expression is satisfied:*

$$61.6>|fe|/(fe\times(1-\beta e)+np2)>9.$$

* * * * *